(12) United States Patent
Anand et al.

(10) Patent No.: US 11,991,511 B2
(45) Date of Patent: May 21, 2024

(54) CONTEXTUAL AWARENESS IN DYNAMIC DEVICE GROUPS

(71) Applicant: Amazon Technologies, Inc., Seattle, WA (US)

(72) Inventors: Ratika Anand, San Jose, CA (US); Adit Jamdar, Sunnyvale, CA (US); Liyun Xiu, Mountain View, CA (US); Parathan Sivagnanasundaram, Hayward, CA (US); Saksham Papreja, San Francisco, CA (US); Nidhi Mendiratta, Sunnyvale, CA (US); Deepak Uttam Shah, Milpitas, CA (US)

(73) Assignee: Amazon Technologies, Inc., Seattle, WA (US)

( * ) Notice: Subject to any disclaimer, the term of this patent is extended or adjusted under 35 U.S.C. 154(b) by 238 days.

(21) Appl. No.: 17/548,250

(22) Filed: Dec. 10, 2021

(65) Prior Publication Data

US 2023/0188892 A1 Jun. 15, 2023

(51) Int. Cl.
*H04R 3/12* (2006.01)
*G06F 3/16* (2006.01)
*G10L 15/08* (2006.01)
*G10L 15/14* (2006.01)
*G10L 15/22* (2006.01)

(52) U.S. Cl.
CPC ............... *H04R 3/12* (2013.01); *G06F 3/165* (2013.01); *G10L 2015/088* (2013.01); *G10L 15/142* (2013.01); *G10L 15/22* (2013.01); *G10L 2015/223* (2013.01)

(58) Field of Classification Search
CPC .................................. H04R 3/12; G06F 3/165
See application file for complete search history.

(56) References Cited

U.S. PATENT DOCUMENTS

| | | | |
|---|---|---|---|
| 9,979,998 B1 * | 5/2018 | Pogue | H04N 21/43637 |
| 10,264,358 B2 * | 4/2019 | Torok | H04R 3/12 |
| 11,019,440 B1 * | 5/2021 | Beck | G06F 3/167 |
| 11,575,758 B1 * | 2/2023 | Thakare | H04L 67/146 |
| 2019/0304507 A1 | 10/2019 | Leyfman et al. | |
| 2020/0154205 A1 * | 5/2020 | Agustin | H03G 3/20 |
| 2020/0401365 A1 | 12/2020 | Wilberding et al. | |
| 2021/0068173 A1 * | 3/2021 | Yore | G06F 3/04847 |
| 2021/0103423 A1 * | 4/2021 | Morganstern | H04L 67/10 |

(Continued)

FOREIGN PATENT DOCUMENTS

EP 3474558 A2 4/2019
WO WO2016145235 A1 9/2016

OTHER PUBLICATIONS

The PCT Search Report and Written Opinion dated Apr. 6, 2023 for PCT application No. PCT/US2022/051219, 14 pages.

*Primary Examiner* — Olisa Anwah
(74) *Attorney, Agent, or Firm* — Lee & Hayes, P.C.

(57) ABSTRACT

Systems and methods for contextual awareness in dynamic device groups are disclosed. For example, a dynamic device group may be generated while output of content is occurring. When a user provides user input to alter the output of the content, contextual data indicating the devices in the dynamic device group when the user input is received may be generated and utilized by an application to determine which devices are to receive a command to perform an action responsive to the user input.

20 Claims, 11 Drawing Sheets

(56) References Cited

U.S. PATENT DOCUMENTS

| | | | |
|---|---|---|---|
| 2021/0263698 A1* | 8/2021 | Fullerton | G06F 3/0482 |
| 2021/0382680 A1* | 12/2021 | Gossain | G06F 3/165 |
| 2022/0214857 A1* | 7/2022 | Lambourne | G06F 16/27 |
| 2022/0417660 A1* | 12/2022 | Wilberding | H04R 3/12 |
| 2023/0097522 A1* | 3/2023 | Mehrabi | G10L 25/51 |
| | | | 381/56 |
| 2023/0308698 A1* | 9/2023 | Beckhardt | H04N 21/43615 |
| | | | 709/217 |

* cited by examiner

CONTEXTUAL AWARENESS IN DYNAMIC DEVICE GROUPS

BACKGROUND

Use of electronic devices to perform actions such as the output of audio has become available. Multiple electronic devices may be utilized to output instances of the same audio in a time-synchronous manner. Described herein are improvements in technology and solutions to technical problems that can be used to, among other things, improve control of content output by devices.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Figure 1:
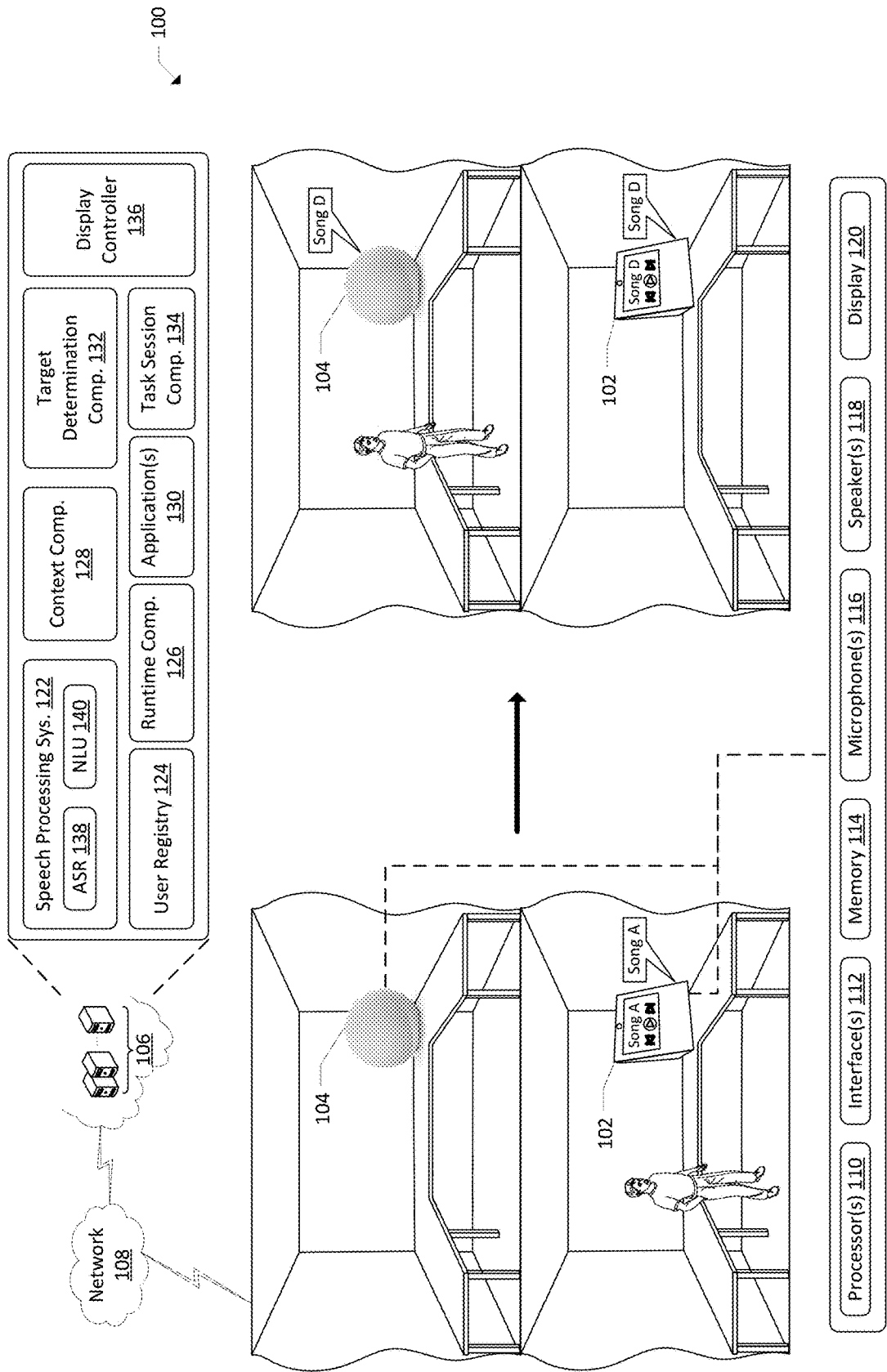
FIG. 1 illustrates a schematic diagram of an example environment for contextual awareness in dynamic device groups.

Systems and methods for contextual awareness in dynamic device groups are disclosed among other things. Take, for example, an environment (such as a home, vehicle, office, store, restaurant, or other space) where one or more users may be present. The environments may include one or more electronic devices that may be utilized by the users. For example, the electronic devices may include voice interface devices (e.g., Echo devices, mobile phones, tablets, personal computers, etc.), graphical interface devices (e.g., televisions, set top boxes, virtual/augmented reality headsets, etc.), and/or touch interface devices (tablets, phones, Echo Show devices, steering wheels, laptops, kiosks, billboard, other devices with buttons, etc.). These electronic devices may be situated in a home, in a place of business, healthcare facility (e.g., hospital, doctor's office, pharmacy, etc.) in a vehicle (e.g., airplane, truck, car, bus, etc.), in a public forum (e.g., shopping center, store, etc.), for example.

In examples, the electronic devices may be configured to output content, such as audio. In certain examples, multiple electronic devices in the environment may be configured to output instances of the same audio in a time-synchronous manner and/or to output portions of audio data at the same time such that a whole-home audio and/or stereo audio experience is provided. In still other examples, one or more of the electronic devices may be configured to output visual content, while one or more other electronic devices output audio associated with images and/or other types of visual content (e.g., lights on a tree changing color in synchronization with music). In these and other examples, output of content in a time-synchronous manner may be based at least in part on received user input indicating which devices are to output the content together. This user input may include the adding of devices to those that are outputting content, removing devices, switching devices, and/or other input that causes the content to start being output or cease being output by various devices.

To allow for a pleasant user experience, and taking an example where the content is audio representing a song, the song may initially be output by a first device and then user input may be received while the song is being output indicating an intent for a second device to also output the song. A dynamic device group may be created based on this input, with the dynamic device group including the first device and the second device, and the second device may commence outputting audio representing the song in time-synchronization with the first device. Thereafter, other devices may be added and/or removed from the dynamic device group, all while the song is being output. In some examples, at least one of the devices may be a multimodal device that includes a display and a graphical user interface (GUI). The GUI may be utilized to receive additional input from the user, such as input indicating a desire to alter output of the content and/or to output different content and/or to cease output of the content. Optimally, when this user input is received, an action associated with the input is caused to be performed by not just the device that received the user input but also the other devices associated with the dynamic device group.

In these and other examples, contextual awareness of dynamic device groups may be utilized to determine what target devices to perform an action on when user input is received. For example, a first device may initiate output of content, and then a second device may be added to the device group such that the second device may also output the content. A user may utilize the GUI to provide user input requesting an action to be performed in association with content that is being output by the dynamic device group. Example user input may include touching a portion of the touchscreen associated with a pause element, a play element, a "next song" element, a "previous song" element, a volume element etc. Other example user input may not be associated with the content that is being currently output. For example, the dynamic device group may be outputting Song A, and the user may utilize the GUI to search for songs by a different artist while Song A is being output. The GUI may display search results and the user may select Song B for output, indicating an intent to cause the dynamic device group to cease outputting Song A and start outputting Song B. In these and other examples, the user input may be received at a device gateway, which may be configured to act as a connection proxy between the user devices and a processing system. An inbound gateway component may receive the input data from the device gateway and may determine an event type associated with the input data, for example a pause event type, a play event type, a "next" event type, etc.

Thereafter, a runtime component may receive event data from the inbound gateway component and may query a context component for contextual data associated with the dynamic device group and/or a device state of the device that received the input. For example, the context component may be configured to determine, such as by utilizing a device identifier associated with the device that received the input, a dynamic device group that is associated with the device when the user input was received. As outlined above, this dynamic device group may differ from a static device group in that the static device group may be created by the user prior to output of the content in question, such as when a user instructs a system to configure a "sound system" group with several devices in a given room associated with the group. This group may persist in association with account data for the user, such that the system manages and directs the group of multiple devices much in the way it manages and directs single devices. A dynamic device group may be a device group that is generated on demand, such as while content is being output. For example, when content is output on a first device and then the user requests that the content be output on a second device too at the same time, a dynamic device group with the first device and the second device may be generated. The context component may be configured to determine the devices belonging to the dynamic device group at the time when the user input is provided. Additionally, the context component may be utilized to determine a current device state of the device that received the user input, such as which content is being output, volume settings, whether content is currently being output, etc.

In examples, additional types of context data may be utilized to determine devices that should be acted upon when user input is received. For example, presence detection may be utilized to dynamically adjust the devices in a group. To illustrate, a user may request that a song be initially output on a first device in a first environment, such as a kitchen. The user may then request that a second device also output the song in another environment, such as in a living room near the kitchen. Thereafter, the user may move from the kitchen and/or the living room to yet another environment, such as a bedroom that includes a third device. One or more of these devices, and/or other devices associated with the environments, may be configured to detect user presence and/or changes in user presence over time. In the example above, the first device and/or the second device may detect that the user is moving away from the kitchen and/or living room and/or that presence of the user ceases being detected. Additionally, or alternatively, the third device may detect the presence of the user as the user moves into the bedroom. In these and other examples, the dynamic device group may be changed to include the third device even though the user has not specifically requested that the song be output on that device. At this point, the user may provide user input to alter the song being output as described herein, and the system may determine that all three of the example devices should be caused to alter the song output. In still further examples, the duration of presence detection at a given device may inform the dynamic device group. For example, if the user's presence is detected for at least a threshold amount of time in the bedroom, the kitchen device and/or the living room device may be dropped from the dynamic group. Additional details on presence detection are provided elsewhere herein.

While the contextual data is being determined by the context component, the system may also send the event data to an orchestrator, which may determine an application configured to handle the event type associated with the event data. In some examples, a task identifier associated with the event, such as "pause output," "play next song," "play content" etc. may be sent by the device to the system as a portion of the input data. However, in other examples, the task identifier may not be sent and/or may be sent in a format that is not readily useable by the system. In these examples, the orchestrator may request a task identifier from a task session component. The task session component may be configured to utilize the input data that was received to determine what task is to be performed in response to the user input. In examples, the results from the context component may be utilized by the task session component to determine the task identifier. For example, the device state data may be utilized by the task session component to determine what the current state of the device is, what input elements are being displayed, and/or how the input was received at the device. The task session component may return the task identifier to the orchestrator, which may communicate with an application gateway to request the application to determine an action to be performed in response to the user input.

At this point, the application may have the data needed to determine the action to be performed, such as causing the content to be paused, causing the content to be played, causing a "next song" to be output, etc. However, the application may not have the data needed to determine what target devices to cause the action to be performed on. To determine the target devices, the application may query a target determination component for indicators of the target devices. The target determination component may query the context component for the contextual data it generated while the runtime component was communicating with the application. By performing the contextual data determination in parallel with requesting the action from the application, latency between when the user provides input and when the action is taken may be decreased. The context component may return an indicator of the devices associated with the dynamic device group when the user input was received to the target determination component, which may communicate the target device indicators to the application. At this point, the application may have determined the action to be performed and may determine the target devices that are to perform the action. The application may send a command indicating the action to be performed to the runtime component, which may communicate the command to the target devices to cause the requested action to be performed. It should be understood that the command may be sent to the device that received the user input, to one or more of the other devices in the dynamic device group, and/or to another device that may communicate with the target devices to cause the action to be performed.

Additionally, when the contextual data is generated, that contextual data may be associated with a context identifier. The context identifier may indicate that the contextual data is associated with the given user input and the associated event data. When a different user input is received, say subsequent to when the first user input is received, the contextual data associated with that first user input will be unavailable for use for the second user input based at least in part on the context identifier indicating that the contextual data is associated with the first user input and not the second user input. This may prevent prior contextual data, which may be associated with an out-of-date dynamic device group, from being utilized.

Additionally, in examples where one or more of the devices includes a display that indicates the content being output and/or details about output of the content, a display controller may be configured to determine what information is to be displayed once the action is performed and on which devices to cause the information to be displayed. For example, the contextual data may be utilized to determine which devices associated with a user account are the target devices. Additionally, the command indicating the action may be utilized to determine how the GUI should be changed to reflect the action. By way of example, if the user input corresponds to pressing "pause," once output of the content is paused the display controller may determine that the GUI should be changed to show that the pause icon is engaged, and/or to present a play option, particularly where the play icon was not presented when the content was being output.

By performing the operations above, a system may add and remove devices from a dynamic device group while content is being output, and when the user requests alteration of output of the content in some way, the alteration may be performed not just on the device that received the input but also the devices currently in the dynamic device group. This may occur even when the alteration is a request to output unrelated content.

The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

Additional details are described below with reference to several example embodiments.

FIG. 1 illustrates a schematic diagram of an example system 100 for contextual awareness in dynamic device groups. The system 100 may include, for example, a first device 102 and a second device 104, which may be described generally as electronic devices 102, 104 and may include a communal device and/or a personal device. In certain examples, the devices 102, 104 may be a voice-enabled device (e.g., Echo devices, mobile phones, tablets, personal computers, etc.), a video interface device (e.g., televisions, set top boxes, virtual/augmented reality headsets, etc.), a touch interface device (tablets, phones, laptops, kiosks, billboard, etc.), and/or an accessory device (e.g., lights, plugs, locks, thermostats, appliances, televisions, clocks, smoke detectors, doorbells, cameras, motion/magnetic/other security-system sensors, etc.). In examples, the electronic device 102, 104 may be set-top box or other device that receives content data and facilitates the output of content, such as on other devices. The electronic device 102, 104 may be situated in a home, a place a business, healthcare facility (e.g., hospital, doctor's office, pharmacy, etc.), in vehicle (e.g., airplane, truck, car, bus, etc.), and/or in a public forum (e.g., shopping center, store, etc.), for example. In the example utilized throughout this disclosure, the first device 102 may be a multimodal device that includes functionality for receiving voice input and for receiving touch input, such as by a GUI. The electronic devices 102, 104 may be configured to send data to and/or receive data from a system 106, such as via a network 108. It should be understood that where operations are described herein as being performed by the system 106, some or all of those operations may be performed by the electronic device 102, 104. It should also be understood that anytime the system 106 is referenced, that system may include any system and/or device, whether local to an environment of the electronic device 102, 104 or remote from that environment. Additionally, it should be understood that a given space and/or environment may include numerous electronic devices 102, 104. It should also be understood that when a "space" or "environment" is used herein, those terms mean an area and not necessarily a given room, building, or other structure, unless otherwise specifically described as such.

The electronic devices 102, 104 may include one or more components, such as, for example, one or more processors 110, one or more network interfaces 112, memory 114, one or more microphones 116, one or more speakers 118, and/or one or more displays 120. The microphones 116 may be configured to capture audio, such as user utterances, and generate corresponding audio data. The speakers 118 may be configured to output audio, such as audio corresponding to audio data received from another device and/or the system 106. The displays 120 may be configured to display images corresponding to image data, such as image data received from the system 106 and/or one or more other devices. Additionally, the displays 120 may be configured as touchscreens that may receive user input, such as via a GUI.

It should be understood that while several examples used herein include a voice-enabled device that allows users to interact therewith via user utterances, one or more other devices, which may not include a voice interface, may be utilized instead of or in addition to voice-enabled devices. In these examples, the device may be configured to send and receive data over the network 108 and to communicate with other devices. As such, in each instance where a voice-enabled device is utilized, a computing device that does not include a voice interface may also or alternatively be used. It should be understood that when voice-enabled devices are described herein, those voice-enabled devices may include phones, computers, and/or other computing devices.

The system 106 may include components such as, for example, a speech processing system 122, a user registry 124, a runtime component 126, a context component 128, one or more applications 130, a target determination component 132, a task session component 134, and/or a display controller 136. It should be understood that while the components of the system 106 are depicted and/or described as separate from each other in FIG. 1, some or all of the components may be a part of the same system. The speech-processing system 122 may include an automatic speech recognition component (ASR) 138 and/or a natural language understanding component (NLU) 140. Each of the components described herein with respect to the system 106 may be associated with their own systems, which collectively may be referred to herein as the system 106, and/or some or all of the components may be associated with a single system. Additionally, the system 106 may include one or more applications, which may be described as skills. "Skills," as described herein may be applications and/or may be a subset of an application. For example, a skill may receive data representing an intent. For example, an intent may be determined by the NLU component 140 and/or as determined from user input via a computing device. Skills may be configured to utilize the intent to output data for input to a text-to-speech component, a link or other resource locator for audio data, and/or a command to a device, such as the electronic device 102, 104. "Skills" may include applications running on devices, such as the electronic device 102, 104, and/or may include portions that interface with voice user interfaces of electronic devices 102, 104.

In instances where a voice-enabled device is utilized, skills may extend the functionality of devices 102, 104 that can be controlled by users utilizing a voice-user interface. In some examples, skills may be a type of application that may be useable in association with accessory devices and may have been developed specifically to work in connection with given accessory devices. Additionally, skills may be a type of application that may be useable in association with the voice-enabled device and may have been developed specifically to provide given functionality to the voice-enabled device. In examples, a non-skill application may be an application that does not include the functionality of a skill. Speechlets, as described herein, may be a type of application that may be usable in association with voice-enabled devices and may have been developed specifically to work in connection with voice interfaces of voice-enabled devices. The application(s) 130 may be configured to cause processor(s) to receive information associated with interactions with the voice-enabled device. The application(s) 130 may also be utilized, in examples, to receive input, such as from a user of a personal device and/or the voice-enabled device and send data and/or instructions associated with the input to one or more other devices.

The components of the system 106 are described in detail below. In examples, some or each of the components of the system 106 may include their own processor(s), network interface(s), and/or memory. As such, by way of example, the speech-processing system 122 may include and/or be associated with processor(s), network interface(s), and/or memory. The other components of the system 106, such as the context component 128, may include and/or be associated with different processor(s), network interface(s), and/or memory, or one or more of these components may utilize some or all of the same processor(s), network interface(s), and/or memory utilized by the speech-processing system 122. These components are described in detail below. Additionally, the operations and/or functionalities associated with and/or described with respect to the components of the system 106 may be performed utilizing cloud-based computing resources. For example, web-based systems such as Elastic Compute Cloud systems or similar systems may be utilized to generate and/or present a virtual computing environment for performance of some or all of the functionality described herein. Additionally, or alternatively, one or more systems that may be configured to perform operations without provisioning and/or managing servers, such as a Lambda system or similar system, may be utilized.

With respect to the components of the memory 114 of the devices 102, 104 and/or the system 106, the user registry 124 may be configured to determine and/or generate associations between users, user accounts, and/or devices. For example, one or more associations between user accounts may be identified, determined, and/or generated by the user registry 124. The user registry 124 may additionally store information indicating one or more applications and/or resources accessible to and/or enabled for a given user account. Additionally, the user registry 124 may include information indicating device identifiers, such as naming identifiers, associated with a given user account, as well as device types associated with the device identifiers. The user registry 124 may also include information indicating user account identifiers, naming indicators of devices associated with user accounts, and/or associations between devices, such as the devices 102, 104. The user registry 124 may also include information associated with usage of the devices 102, 104. It should also be understood that a user account may be associated with one or more than one user profiles. It should also be understood that the term "user account" may be used to describe a set of data and/or functionalities associated with a given account identifier. For example, data identified, determined, and/or generated while using some or all of the system 100 may be stored or otherwise associated with an account identifier. Data associated with the user accounts may include, for example, account access information, historical usage data, device-association data, and/or preference data.

The speech-processing system 122 may be configured to receive audio data from the devices 102, 104 and/or other devices and perform speech-processing operations. For example, the ASR component 138 may be configured to generate text data corresponding to the audio data, and the NLU component 140 may be configured to generate intent data corresponding to the audio data. In examples, intent data may be generated that represents the audio data, such as without the generation and/or use of text data. The intent data may indicate a determined intent associated with the user utterance as well as a payload and/or value associated with the intent. For example, for a user utterance of "play Song A on Speaker 1 and Speaker 2," the NLU component 140 may identify a "play content" intent and the payload may be "Song A on Speaker 1 and Speaker 2." In this example where the intent data indicates an intent to output audio associated with Song A on two devices, the speech-processing system 122 may call one or more speechlets to effectuate the intent. Speechlets, as described herein may otherwise be described as applications and may include functionality for utilizing intent data to generate directives and/or instructions. For example, a music speechlet may be called when the intent indicates that a song is to be provided. The speechlet may be designated as being configured to handle the intent of identifying and providing audio data representing songs, for example. The speechlet may receive the intent data and/or other data associated with the user utterance from the NLU component 140, such as by an orchestrator of the system 106, and may perform operations to instruct the devices 102, 104 to output the content, for example. The system 106 may generate audio data confirming that requested content has been provided, such as by a text-to-speech component. The audio data may be sent from the system 106 to the electronic devices 102, 104 for output of corresponding audio by the speakers 118 of the devices 102, 104.

Additionally, and taking an example where the output content is audio representing a song, the song may initially be output by the first device 102 and then user input may be received while the song is being output indicating an intent for the second device 104 to also output the song. The second device 104 may be added to this dynamic device group and the 104 second device may commence outputting audio representing the song in time-synchronization with the first device 102. Thereafter, other devices may be added and/or removed from the dynamic device group, all while the song is being output. In some examples, at least one of the devices 102, 104 may be a multimodal device that includes a display and a GUI. The GUI may be utilized to receive additional input from the user, such as input indicating a desire to alter the output of the content and/or to output different content and/or to cease output of the content. Optimally, when this user input is received, an action associated with the input is caused to be performed by not just the device that received the user input but also the other devices associated with the dynamic device group.

In these and other examples, contextual awareness of dynamic device groups may be utilized to determine what target devices to perform an action on when user input is received. For example, the first device 102 may initiate output of content, and then the second device 104 may be added to the dynamic device group such that the second device 104 may also output the content. A user may utilize a GUI to provide user input requesting an action to be performed in association with content that is being output by the dynamic device group. Example user input may include pressing a portion of the display 120 associated with a pause element, a play element, a "next song" element, a "previous song" element, a volume element etc. Other example user input may not be associated with the content that is being currently output. For example, the dynamic device group may be outputting Song A, and the user may utilize the GUI to search for songs by a different artist while Song A is being output. The GUI may display search results and the user may select Song B for output, indicating an intent to cause the dynamic device group to cease outputting Song A and start outputting Song B. In these and other examples, the user input may be received at a device gateway, which may be configured to act as a connection proxy between the user devices 102, 104 and the system 106. An inbound gateway component may receive the input data from the device gateway and may determine an event type associated with the input data, for example a pause event type, a play event type, a "next" event type, etc.

Thereafter, the runtime component 126 may receive event data from the inbound gateway component and may query the context component 128 for contextual data associated with the dynamic device group and/or a device state of the device 102 that received the input. For example, the context component may be configured to determine, such as by utilizing a device identifier associated with the device 102 that received the input, a dynamic device group that is associated with the device 102 when the user input was received. As outlined above, this dynamic device group may differ from a static device group in that the static device group may be created by the user prior to output of the content in question, such as when a user makes a "sound system" group with several devices in a given room associated with the group. This group may persist in association with account data for the user and may not be altered unless a user requests that the group be altered. A dynamic device group may be a device group that is generated on the fly while content is being output and without a user specifically requesting that a persisting group be created. For example, when content is output on the first device 102 and then the user requests that the content be output as well on the second device 104, a dynamic device group with the first device 102 and the second device 104 may be generated. The context component 128 may be configured to determine the devices belonging to the dynamic device group at the time when the user input is provided. Additionally, the context component 128 may be utilized to determine a current device state of the device 102 that received the user input, such as which content is being output, volume settings, whether content is currently being output, etc.

In examples, additional types of context data may be utilized to determine devices that should be acted upon when user input is received. For example, presence detection may be utilized to dynamically adjust the devices in a group. To illustrate, a user may request that a song be initially output on a first device in a first environment, such as a kitchen. The user may then request that a second device also output the song in another environment, such as in a living room near the kitchen. Thereafter, the user may move from the kitchen and/or the living room to yet another environment, such as a bedroom that includes a third device. One or more of these devices, and/or other devices associated with the environments, may be configured to detect user presence and/or changes in user presence over time. In the example above, the first device and/or the second device may detect that the user is moving away from the kitchen and/or living room and/or that presence of the user ceases being detected. Additionally, or alternatively, the third device may detect the presence of the user as the user moves into the bedroom. In these and other examples, the dynamic device group may be changed to include the third device even though the user has not specifically requested that the song be output on that device. At this point, the user may provide user input to alter the song being output as described herein, and the system may determine that all three of the example devices should be caused to alter the song output. In still further examples, the duration of presence detection at a given device may inform the dynamic device group. For example, if the user's presence is detected for at least a threshold amount of time in the bedroom, the kitchen device and/or the living room device may be dropped from the dynamic group.

To perform presence detection as described herein, a presence component may be utilized as described below. Example data types for detecting presence may include audio data, image data, state data, and/or device data. The audio data may be received from a microphone associated with an environment where a given device is situated. The audio data may be analyzed by the presence component to determine whether the audio data indicates the presence of user speech, footsteps, use of devices in the environment, and/or the presence of other noises that are indicative of a user being present. To do so, the presence component may compare the audio data to reference audio data to detect the presence of such noises. In examples where user speech is to be detected, ASR data may be utilized and/or detection of a wake word may be utilized.

When image data is described herein as being analyzed, that analysis may include the use of computer vision to identify objects depicted in the image data. For example, with respect to computer vision techniques, computer vision includes methods for acquiring, processing, analyzing, and understanding images and, in general, high-dimensional data from the real world in order to produce numerical or symbolic information, e.g., in the form of decisions. Computer vision seeks to duplicate the abilities of human vision by electronically perceiving and understanding an image. Understanding in this context means the transformation of visual images (the input of the retina) into descriptions of the world that can interface with other thought processes and elicit appropriate action. This image understanding can be seen as the disentangling of symbolic information from image data using models constructed with the aid of geometry, physics, statistics, and learning theory. Computer vision has also been described as the enterprise of automating and integrating a wide range of processes and representations for vision perception. As a scientific discipline, computer vision is concerned with the theory behind artificial systems that extract information from images. The image data can take many forms, such as video sequences, views from multiple cameras, or multi-dimensional data from a scanner. As a technological discipline, computer vision seeks to apply its theories and models for the construction of computer vision systems.

One aspect of computer vision comprises determining whether or not the image data contains some specific object, feature, or activity. Different varieties of computer vision recognition include: Object Recognition (also called object classification)—One or several pre-specified or learned objects or object classes can be recognized, usually together with their 2D positions in the image or 3D poses in the scene. Identification—An individual instance of an object is recognized. Examples include identification of a specific person's face or fingerprint, identification of handwritten digits, or identification of a specific vehicle. Detection—The image data are scanned for a specific condition. Detection based on relatively simple and fast computations is sometimes used for finding smaller regions of interesting image data that can be further analyzed by more computationally demanding techniques to produce a correct interpretation.

Several specialized tasks based on computer vision recognition exist, such as: Optical Character Recognition (OCR)— Identifying characters in images of printed or handwritten text, usually with a view to encoding the text in a format more amenable to editing or indexing (e.g., ASCII). 2D Code Reading—Reading of 2D codes such as data matrix and QR codes. Facial Recognition. Shape Recognition Technology (SRT)—Differentiating human beings (e.g., head and shoulder patterns) from objects.

Some functions and components (e.g., hardware) found in many computer vision systems are described here. For example, a digital image is produced by one or several image sensors, which, besides various types of light-sensitive cameras, may include range sensors, tomography devices, radar, ultra-sonic cameras, etc. Depending on the type of sensor, the resulting image data may be a 2D image, a 3D volume, or an image sequence. The pixel values may correspond to light intensity in one or several spectral bands (gray images or color images), but can also be related to various physical measures, such as depth, absorption or reflectance of sonic or electromagnetic waves, or nuclear magnetic resonance. Before a computer vision method can be applied to image data in order to extract some specific piece of information, it is usually beneficial to process the data in order to assure that it satisfies certain assumptions implied by the method. Examples of pre-processing include, but are not limited to re-sampling in order to assure that the image coordinate system is correct, noise reduction in order to assure that sensor noise does not introduce false information, contrast enhancement to assure that relevant information can be detected, and scale space representation to enhance image structures at locally appropriate scales. Image features at various levels of complexity are extracted from the image data. Typical examples of such features are: Lines, edges, and ridges; Localized interest points such as corners, blobs, or points; More complex features may be related to texture, shape, or motion. At some point in the processing a decision may be made about which image points or regions of the image are relevant for further processing. Examples are: Selection of a specific set of interest points; Segmentation of one or multiple image regions that contain a specific object of interest; Segmentation of the image into nested scene architecture comprising foreground, object groups, single objects, or salient object parts (also referred to as spatial-taxon scene hierarchy). At this point, the input may be a small set of data, for example a set of points or an image region that is assumed to contain a specific object. The remaining processing may comprise, for example: verification that the data satisfy model-based and application-specific assumptions; estimation of application-specific parameters, such as object pose or object size; classifying a detected object into different categories; and comparing and combining two different views of the same object. Making the final decision required for the application, for example match/no-match in recognition applications, may then be performed.

When state data is utilized, the state data may indicate when and how device states have changed for devices in the environment. For example, when a smart light is turned on, an indication of the change of state from off to on may be stored. The state itself, or the timing of the state change may indicate that a user is present in the environment and/or that the user is likely present.

When device data is utilized, the device data may indicate the presence of a personal device associated with a user, such as a mobile phone and/or a wearable device. These devices may send out beacons that are received at a given primary device, indicating that the devices are proximate to the primary device and also indicating that the user associated with such devices are present. The data associated with the presence event may be any data that may be utilized by the activity model to determine a predefined activity, if any, that is occurring in association with an environment in which a target device is situated.

For example, sensor data may be received from the one or more connected devices in an environment associated with the target device. The one or more connected devices may be Internet-of-Things (IoT) devices that may generate data indicating one or more attributes of the environment. For example, the connected devices may include a device having a microphone configured to capture audio representing sounds made within the environment and to generate corresponding audio data that may be analyzed as described herein. The connected devices may also include a device having a camera and/or motion sensor. The device having the camera may be configured to capture images of the environment and generate corresponding image data that may be analyzed as described herein. The device having the motion sensor may be configured to detect motion within a field of view of the device and to generate indications that motion has been detected. The connected devices may also include devices such as door locks, which may be configured to generate indications of when the door lock is engaged, or otherwise locked, and when the door lock is disengaged, or otherwise unlocked. The connected devices may also include devices having an audio-output component, such as a speaker, that may be configured to output audio into the environment. The connected devices may also include other devices that may be controlled utilizing, for example voice input and/or other user input such as user input received via a user interface. These connected devices may be, for example and not by way of limitation, lights, switches, plugs, vehicles, televisions, thermostats, doorbells, appliances, window treatments, security systems, etc. The connected devices may also include personal devices, such as cellphones, tablets, personal computers, etc., which may be configured to communicate with other devices within the environment when the personal devices are brought into the environment. Some or all of these devices may generate sensor data associated with the connected devices.

An activity model may be configured to receive the sensor data and to utilize the sensor data to determine one or more activities that users within the environment are engaged in. These activities may include whether users are present or not present in the environment. Additional details on presence detection are provided below. These activities may also include specific activities that a user is engaged in. For example, the activity model may be configured to utilize the sensor data to determine that a user is engaged in a cooking activity and/or an eating activity. Additional activities may include social gatherings, entry and/or exit from a given space within the environment, washing dishes, watching television, etc. The activities may also indicate specific users that are present within a given space, a number of occupants within a given space, and/or other indicators about users associated with the environment. To determine that a certain predefined activity is being performed, the activity model may be trained to determine that the predefined activity is being performed when certain sensor data is received. For example, the predefined activity of users being away from the environment may be based on an absence of sensor data indicating sounds associated with movement within the environment, the opening and closing of a garage door and/or an exterior door to the environment, an absence of sensor data indicating images associated with movement within the environment, an absence of device state changes, etc. By way of continued example, the predefined activity of a user being present within the environment may be based on motion detection within the environment, sensor data indicating sounds associated with movement within the environment, signals received from a personal device associated with a user, etc. Furthermore, with respect to given specific activities such as cooking, acoustic event detection techniques, as described more fully below, may be utilized to detect sounds that have been predefined to correspond to cooking, such as the filling of a pot with water, the sizzle sound made from frying, the turning on of an oven, chopping sounds, etc. Predefined activities such as cooking may also be determined from a prolonged presence detection of a user in a space indicated as a kitchen, for example. It should be understood that some or all of the sensor data described herein may be utilized to determine when a predefined activity is taking place within an environment, and the predefined activities may include those specifically used as examples herein and/or any other predefined activity that the activity model is trained to detect.

In examples, a presence detection module may use one or more models to analyze audio data to determine if a user is present and/or an activity being performed by a user. The presence detection module may include a number of components to process and analyze the audio data. Audio data, such as feature vectors, and/or raw audio data may be input into a frame scorer which may operate a trained model using machine learning techniques (such as a DNN sound classifier) to score particular audio data as likely corresponding to human presence or not. For example, the frame scorer may process a feature vector representing a frame's worth of audio data and create a score representing a probability that the frame corresponds to user presence and/or a probability that the frame corresponds to a user performing a particular activity. The score may be a binary indicator (for example, 0 for no human/activity detected, 1 for human/activity detected) or may be a different value indicating a probability or likelihood of human/activity presence. The scores may be passed to a temporal aggregation machine learning techniques to determine whether an incoming frame level score is sufficient to decide whether the frame should be classified as human/activity detected YES or human/activity detected NO, represented by frame decision. In making a decision for a particular frame, the temporal aggregation component may consider the score from the individual frame as well as potentially scores from other frames (e.g., a certain number of frames coming before or after) as well as reference frame-level scores to align the output of the temporal aggregation component.

The temporal aggregation component may operate an HMM to alternate states between human/activity detected YES and human/activity detected NO. One example of such operation is a state machine approach. State S=0 may correspond to no human/activity presence detected while state S=1 corresponds to human/activity presence detected. The probability of staying at state 0 is indicated as $P_{0\ to\ 0}$. The device will stay at state 0 (for example when going from frame t to frame t+1) as represented by $S_{t+1}=P_t^*(1-a)+f_t^*a$ where $f_t$ is the frame level score for frame t, a is a configurable attack rate (e.g., a factor representing how quickly the system should transition from no presence detected to presence detected), and $P_t$ represents a weighted sum/cumulated version of $f_t$. $P_t$ may be set to an initial value (e.g., 1) and then may decay based on the formula for $P_{t+1}$ shown below. The device will stay at state 0 if $P_t^*(1-a)+f_t^*a<T_{0to1}$ where $T_{0to1}$ represents a configurable score threshold for transitioning from state 0 to state 1. Otherwise, the device will transition from state 0 to state 1 (e.g., $P_t+i=1$, shown as $P_{0\ to\ 1}$) if $P_t^*(1-a)+f_t^*a\ T_{0to1}$.

The device may stay at state 1 (shown as $P_{1\ to\ 1}$) as represented by $P_{t+1}=P_t^*r\ f_t^*(1-r)$ where r is a configurable release rate (e.g., a factor representing how quickly the system should transition from presence detected to no presence detected). The device will stay at state 1 if $P_t^*r+f_t^*(1-r)>T_{1to0}$ where $T_{1to0}$ represents a configurable score threshold for transitioning from state 1 to state 0. Otherwise the device will transition from state 1 to state 0 (e.g., $P_t+i=0$, shown as $P_{1\ to\ 0}$) if $P_t^*r+f_t^*(1-r)<T_{1to0}$. Thresholds $T_{0to1}$ and $T_{1to0}$ and may be different, or may be the same.

While the decision is described as a frame decision, a decision may be made on groups of frames rather than (or in addition to) individual frames. Certain frames may be grouped and analyzed to decide whether the frames correspond to human presence being detected. Further, a classifier may be used to determine a presence decision for a frame or group of frames.

The temporal aggregation component may apply certain smoothing to avoid rapid changes in the frame decision (e.g., rapid state transitions). Such smoothing may account for natural pauses or breaks in audio that may not necessarily indicate a change in whether a human is present. For example, if the system detects washing dishes, then detects a momentary silence, then detects washing dishes again, the frames during the silence may correspond to scores corresponding to no presence detected even if the human who was washing is still in the vicinity of the device. To account for such audio fluctuations the temporal aggregation component may wait to change a state (e.g., a frame decision) until a certain minimum number of frames are seen that have scores on the same side of the threshold. This minimum may be configured and may be different depending on which side of which threshold the frames appear.

Frame decisions may be passed to a presence indication generator. The presence indication generator generates a periodic presence indicator which indicates the presence status at a particular point in time. The presence indication generator may generate a presence indicator according to a periodic schedule, for example every 5 seconds, 10 seconds, or the like. The presence indicator may be a representation of the frame decision taken at a particular moment in time. For example, if at time t, the frame decision is 1, the presence indicator corresponding to time t will be 1. Similarly, if at time t+30 seconds the frame decision is 1, the presence indicator for time t+30 will be 1, even if the frame decision for frames t+1 through t+29 were all 0. Alternatively, the presence indicator may be an average binary representation of the majority of frame decisions taken over a period of time. In the above example, the frame decision at t may be 1, but then if the frame decision for frames t+1 through t+29 were all 0, the frame decision for time t+30 will also be 0, even if the frame decision for time t+30 is 1. The presence indicator may also be calculated in other manners.

While the contextual data is being determined by the context component 128, the system 106 may also send the event data to an orchestrator, which may determine an application 130 that is configured to handle the event type associated with the event data. In some examples, a task identifier associated with the event, such as "pause output," "play next song," "play content" etc. may be sent by the device 102 to the system 106 as a portion of the input data. However, in other examples, the task identifier may not be sent and/or may be sent in a format that is not readily useable by the system 106. In these examples, the orchestrator may request a task identifier from the task session component 134. The task session component 134 may be configured to utilize the input data that was received to determine what task is to be performed in response to the user input. In examples, the results from the context component 128 may be utilized by the task session component 134 to determine the task identifier. For example, the device state data may be utilized by the task session component 134 to determine what the current state of the device 102 is, what input elements are being displayed, and/or how the input was received at the device 102. The task session component 134 may return the task identifier to the orchestrator, which may communicate with an application gateway to request the application 130 to determine an action to be performed in response to the user input.

At this point, the application 130 may have the data needed to determine the action to be performed, such as causing the content to be paused, causing the content to be played, causing a "next song" to be output, etc. However, the application 130 may not have the data needed to determine what target devices to cause the action to be performed on. To determine the target devices, the application may query the target determination component 132 for indicators of the target devices. The target determination component 132 may query the context component 128 for the contextual data it generated while the runtime component 126 was communicating with the application 130. By performing the contextual data determination in parallel with requesting the action from the application 130, latency between when the user provides input and when the action is taken may be decreased. The context component 128 may return an indicator of the devices associated with the dynamic device group when the user input was received to the target determination component 132, which may communicate the target device indicators to the application 130. At this point, the application 130 may have determined the action to be performed and may determine the target devices that are to perform the action. The application 130 may send a command indicating the action to be performed to the runtime component 126, which may communicate the command to the target devices to cause the requested action to be performed. It should be understood that the command may be sent to the device 102 that received the user input, to one or more of the other devices 104 in the dynamic device group, and/or to another device that may communicate with the target devices to cause the action to be performed.

As shown in FIG. 1 two devices 102, 104 are present in an environment and at least one of the devices 102, 104 is outputting content corresponding to "Song A." User input is received on the first device 102 corresponding to the selection of "Song D" for output by the devices 102, 104 instead of "Song A." The process described above is utilized to determine the action to be performed and to determine the target devices in the dynamic device group that are to perform the action, here being to output Song D instead of Song A. Having received the command to output Song D, both the first device 102 and the second device 104 are caused to output Song D. This may be performed, in examples, where presence detection of the user in the environment of device 104 occurs.

Additionally, when the contextual data is generated, that contextual data may be associated with a context identifier. The context identifier may indicate that the contextual data is associated with the given user input and its associated event data. When a different user input is received, say subsequent to when the first user input is received, the contextual data associated with that first user input will be unavailable for use for the second user input based at least in part on the context identifier indicating that the contextual data is associated with the first user input and not the second user input. This may prevent prior contextual data, which may be associated with an out-of-date dynamic device group, from being utilized.

Additionally, in examples where one or more of the devices 102, 104 includes a display 120 that indicates the content being output and/or details about output of the content, the display controller 136 may be configured to determine what information is to be displayed once the action is performed and on which devices to cause the information to be displayed. For example, the contextual data may be utilized to determine which devices associated with a user account are the target devices from the action. Additionally, the command indicating the action may be utilized to determine how the GUI should be changed to reflect the action. By way of example, if the user input corresponds to pressing "pause," once output of the content is paused the display controller 136 may determine that the GUI should be changed to show that the pause icon is engaged, and/or to present a play option, particularly where the play icon was not presented when the content was being output.

By performing the operations above, a user may add and remove devices 102, 104 from a dynamic device group while content is being output, and when the user requests alteration of the output of the content in some way, the alteration may be performed not just on the device 102 that received the input but also the devices 104 currently in the dynamic device group. This may occur even when the alteration is a request to output unrelated content.

It should be understood that while the example provided herein is with respect to two audio-output devices 102, 104 that output audio in a time-synchronous manner, this disclosure includes the time-synchronous output of any content as between two or more devices 102, 104. For example, synchronized output of images on one device 102 and related audio on another device 104 may be performed utilizing the techniques described herein.

It should be noted that while text data is described as a type of data utilized to communicate between various components of the system 106 and/or other systems and/or devices, the components of the system 106 may use any suitable format of data to communicate. For example, the data may be in a human-readable format, such as text data formatted as XML, SSML, and/or other markup language, or in a computer-readable format, such as binary, hexadecimal, etc., which may be converted to text data for display by one or more devices such as the devices 102, 104.

As shown in FIG. 1, several of the components of the system 106 and the associated functionality of those components as described herein may be performed by one or more of the electronic devices 102, 104. Additionally, or alternatively, some or all of the components and/or functionalities associated with the electronic devices 102, 104 may be performed by the system 106.

It should be noted that the exchange of data and/or information as described herein may be performed only in situations where a user has provided consent for the exchange of such information. For example, upon setup of devices and/or initiation of applications, a user may be provided with the opportunity to opt in and/or opt out of data exchanges between devices and/or for performance of the functionalities described herein. Additionally, when one of the devices is associated with a first user account and another of the devices is associated with a second user account, user consent may be obtained before performing some, any, or all of the operations and/or processes described herein. Additionally, the operations performed by the components of the systems described herein may be performed only in situations where a user has provided consent for performance of the operations.

As used herein, a processor, such as processor(s) 110 and/or the processor(s) described with respect to the components of the system 106, may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. The processor(s) 110 and/or the processor(s) described with respect to the components of the system 106 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 110 and/or the processor(s) described with respect to the components of the system 106 may possess its own local memory, which also may store program components, program data, and/or one or more operating systems.

The memory 114 and/or the memory described with respect to the components of the system 106 may include volatile and nonvolatile memory, removable and non-removable media implemented in any method or technology for storage of information, such as computer-readable instructions, data structures, program component, or other data. Such memory 114 and/or the memory described with respect to the components of the system 106 includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory 114 and/or the memory described with respect to the components of the system 106 may be implemented as computer-readable storage media ("CRSM"), which may be any available physical media accessible by the processor(s) 110 and/or the processor(s) described with respect to the system 106 to execute instructions stored on the memory 114 and/or the memory described with respect to the components of the system 106. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, such as memory 114 and/or the memory described with respect to the components of the system 106, discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Washington, USA; the Windows operating system from Microsoft Corporation of Redmond, Washington, USA; LynxOS as promulgated by Lynx Software Technologies, Inc. of San Jose, California; Operating System Embedded (Enea OSE) as promulgated by ENEA AB of Sweden; and so forth.

The network interface(s) 112 and/or the network interface(s) described with respect to the components of the system 106 may enable messages between the components and/or devices shown in system 100 and/or with one or more other polling systems, as well as other networked devices. Such network interface(s) 112 and/or the network interface(s) described with respect to the components of the system 106 may include one or more network interface controllers (NICs) or other types of transceiver devices to send and receive messages over the network 108.

For instance, each of the network interface(s) 112 and/or the network interface(s) described with respect to the components of the system 106 may include a personal area network (PAN) component to enable messages over one or more short-range wireless message channels. For instance, the PAN component may enable messages compliant with at least one of the following standards IEEE 802.15.4 (Zig- Bee), IEEE 802.15.1 (Bluetooth), IEEE 802.11 (WiFi), or any other PAN message protocol. Furthermore, each of the network interface(s) 112 and/or the network interface(s) described with respect to the components of the system 106 may include a wide area network (WAN) component to enable message over a wide area network.

In some instances, the system 106 may be local to an environment associated the electronic devices 102, 104. For instance, the system 106 may be located within one or more of the electronic devices 102, 104. In some instances, some or all of the functionality of the system 106 may be performed by one or more of the electronic devices 102, 104. Also, while various components of the system 106 have been labeled and named in this disclosure and each component has been described as being configured to cause the processor(s) to perform certain operations, it should be understood that the described operations may be performed by some or all of the components and/or other components not specifically illustrated. It should be understood that, in addition to the above, some or all of the operations described herein may be performed on a phone or other mobile device and/or on a device local to the environment, such as, for example, a hub device in a home and/or office environment, a self-driving automobile, a bus, an airplane, a camper, a trailer, and/or other similar object having a computer to perform its own sensor processing, etc.

Figure 2:
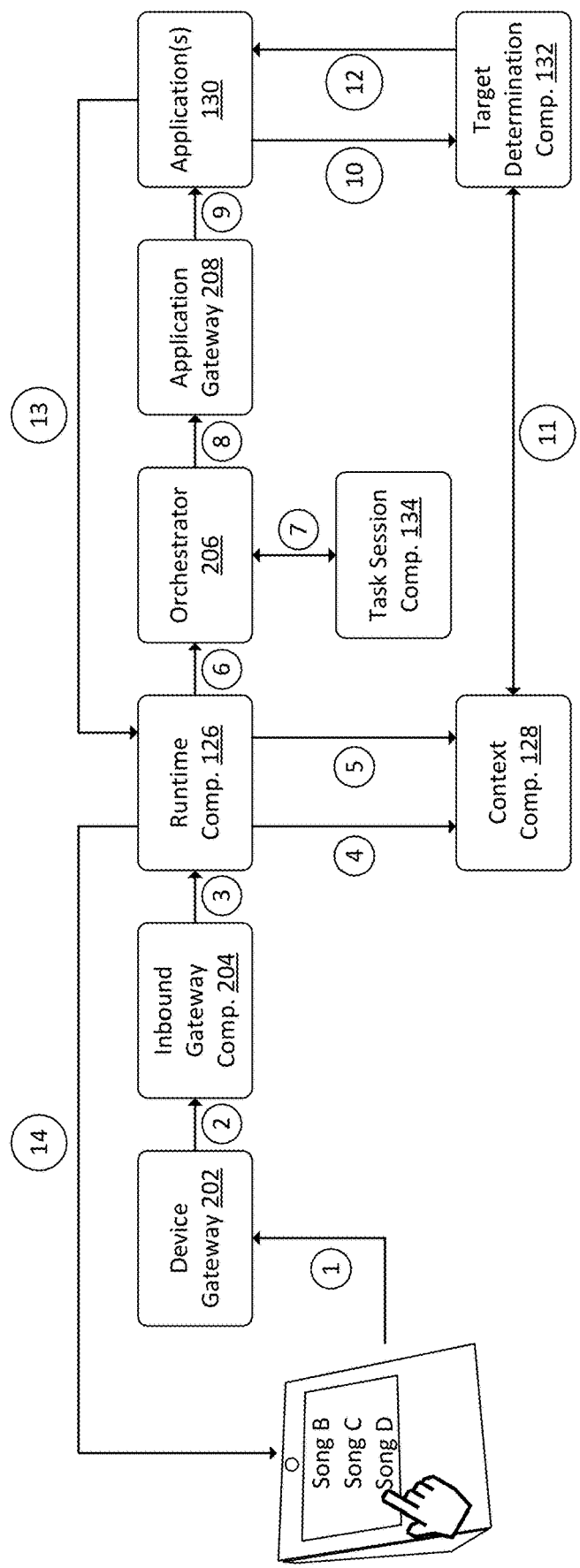
FIG. 2 illustrates a conceptual diagram of example components utilized for contextual awareness in dynamic device groups.

FIG. 2 illustrates a conceptual diagram of example components utilized for contextual awareness in dynamic device groups. The components of FIG. 2 may be the same or similar to those presented in FIG. 1. For example, FIG. 2 may include a device 102, a runtime component 126, a context component 128, one or more applications 130, a target determination component 132, and/or a task session component 134. Additionally, FIG. 2 may include a device gateway 202, an inbound gateway component 204, an orchestrator 206, and/or an application gateway 208. These components may be utilized to determine target devices to cause an action to be performed on in response to certain user input.

To illustrate, taking an example where the output content is audio representing a song, the song may initially be output by the first device 102 and then user input may be received while the song is being output indicating an intent for a second device to also output the song. The second device may be added to this dynamic device group and the second device may commence outputting audio representing the song in time-synchronization with the first device 102. Thereafter, other devices may be added and/or removed from the dynamic device group, all while the song is being output. In some examples, at least one of the devices may be a multimodal device that includes a display and a GUI. The GUI may be utilized to receive additional input from the user, such as input indicating a desire to alter the output of the content and/or to output different content and/or to cease output of the content. Optimally, when this user input is received, an action associated with the input is caused to be performed by not just the device that received the user input but also the other devices associated with the dynamic device group.

In these and other examples, contextual awareness of dynamic device groups may be utilized to determine what target devices to perform an action on when user input is received. For example, the first device 102 may initiate output of content, and then the second device 104 may be added to the dynamic device group such that the second device may also output the content. A user may utilize a GUI to provide, at step 1, user input requesting an action to be performed in association with content that is being output by the dynamic device group. Example user input may include pressing a portion of the display associated with a pause element, a play element, a "next song" element, a "previous song" element, a volume element etc. Other example user input may not be associated with the content that is being currently output. For example, the dynamic device group may be outputting Song A, and the user may utilize the GUI to search for songs by a different artist while Song A is being output. The GUI may display search results and the user may select Song B for output, indicating an intent to cause the dynamic device group to cease outputting Song A and start outputting Song B. In these and other examples, the user input may be received at the device gateway 202, which may be configured to act as a connection proxy between the user devices and the system. The inbound gateway component 204 may receive, at step 2, the input data from the device gateway 202 and may determine an event type associated with the input data, for example a pause event type, a play event type, a "next" event type, etc.

Thereafter, at step 3, the runtime component 126 may receive event data from the inbound gateway component 204 and may query, at step 4, the context component 128 for contextual data associated with the dynamic device group and/or may query the context component 128 at step 4 for a device state of the device 102 that received the input. For example, the context component may be configured to determine, such as by utilizing a device identifier associated with the device 102 that received the input, a dynamic device group that is associated with the device 102 when the user input was received. As outlined above, this dynamic device group may differ from a static device group in that the static device group may be created by the user prior to output of the content in question, such as when a user makes a "sound system" group with several devices in a given room associated with the group. This group may persist in association with account data for the user and may not be altered unless a user requests that the group be altered. A dynamic device group may be a device group that is generated on the fly while content is being output and without a user specifically requesting that a persisting group be created. For example, when content is output on the first device 102 and then the user requests that the content be output as well on the second device, a dynamic device group with the first device 102 and the second device may be generated. The context component 128 may be configured to determine the devices belonging to the dynamic device group at the time when the user input is provided. Additionally, the context component 128 may be utilized to determine a current device state of the device 102 that received the user input, such as which content is being output, volume settings, whether content is currently being output, etc.

While the contextual data is being determined by the context component 128, the runtime component 126 may, at step 6, also send the event data to the orchestrator 206, which may determine an application 130 that is configured to handle the event type associated with the event data. In some examples, a task identifier associated with the event, such as "pause output," "play next song," "play content" etc. may be sent by the device 102 to the system as a portion of the input data. However, in other examples, the task identifier may not be sent and/or may be sent in a format that is not readily useable by the system. In these examples, the orchestrator 206 may, at step 7, request a task identifier from the task session component 134. The task session component 134 may be configured to utilize the input data that was received to determine what task is to be performed in response to the user input. In examples, the results from the context component 128 may be utilized by the task session component 134 to determine the task identifier. For example, the device state data may be utilized by the task session component 134 to determine what the current state of the device 102 is, what input elements are being displayed, and/or how the input was received at the device 102. The task session component 134 may return the task identifier to the orchestrator 206, which may communicate, at step 8, with the application gateway 208 to request, at step 9, the application 130 to determine an action to be performed in response to the user input.

At this point, the application 130 may have the data needed to determine the action to be performed, such as causing the content to be paused, causing the content to be played, causing a "next song" to be output, etc. However, the application 130 may not have the data needed to determine what target devices to cause the action to be performed on. To determine the target devices, the application may query, at step 10, the target determination component 132 for indicators of the target devices. The target determination component 132 may query, at step 11, the context component 128 for the contextual data it generated while the runtime component 126 was communicating with the application 130. By performing the contextual data determination in parallel with requesting the action from the application 130, latency between when the user provides input and when the action is taken may be decreased. The context component 128 may return an indicator of the devices associated with the dynamic device group when the user input was received to the target determination component 132, which may communicate, at step 12, the target device indicators to the application 130. At this point, the application 130 may have determined the action to be performed and may determine the target devices that are to perform the action. The application 130 may send, at step 13, a command indicating the action to be performed to the runtime component 126, which may communicate, at step 14, the command to the target devices to cause the requested action to be performed. It should be understood that the command may be sent to the device 102 that received the user input, to one or more of the other devices 104 in the dynamic device group, and/or to another device that may communicate with the target devices to cause the action to be performed.

Figure 3:
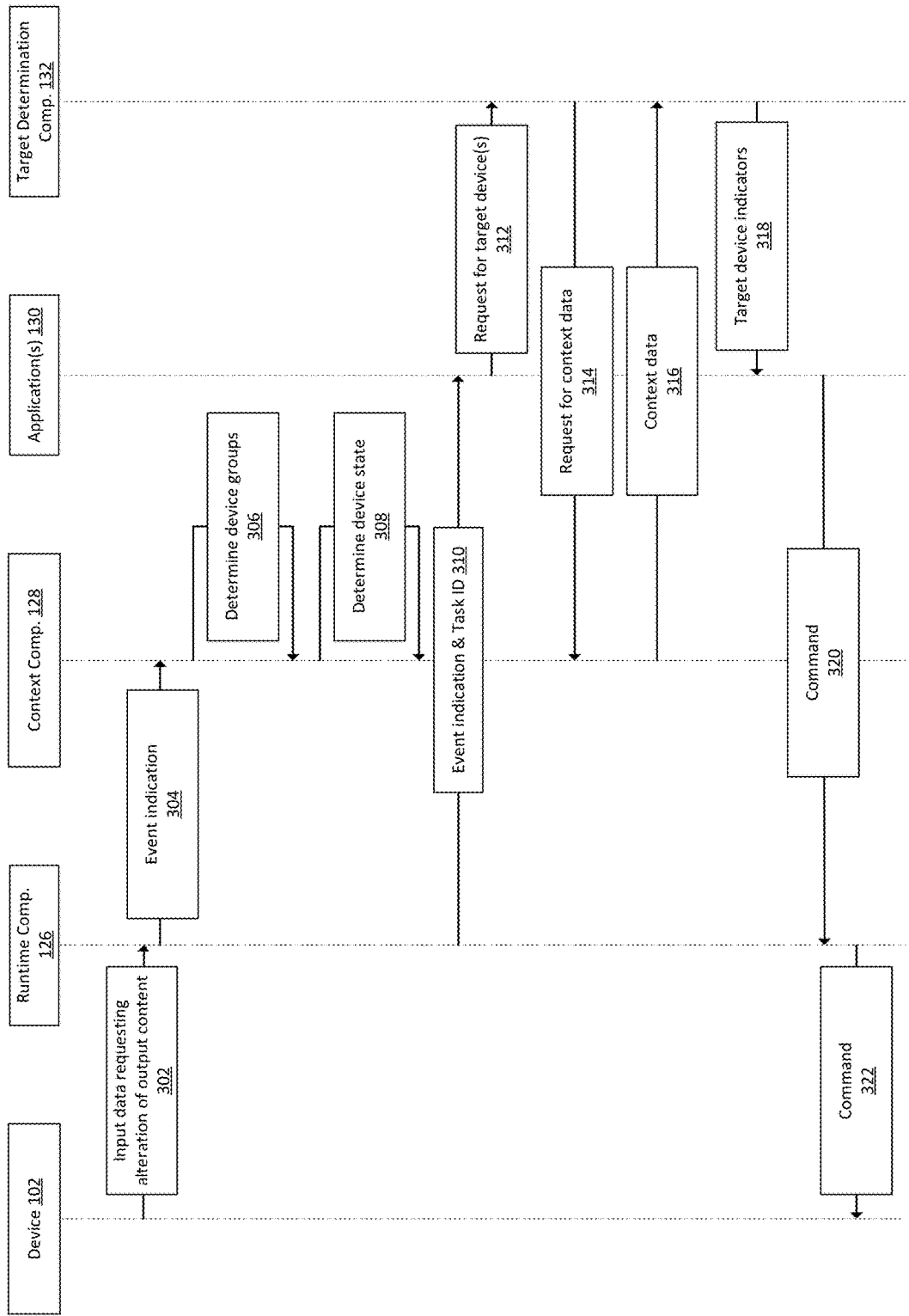
FIG. 3 illustrates a sequence diagram showing an example process for contextual awareness in dynamic device groups where a task identifier is provided by the requesting device.

FIG. 3 illustrates a sequence diagram showing an example process for contextual awareness in dynamic device groups where a task identifier is provided by the requesting device. While the sequence diagram depicts the performance of operations and/or the transmission of certain data in a sequential manner, the operations may be performed in a different order than the order depicted in FIG. 3 and/or at least a portion of the operations may be performed in parallel.

For example, at block 302, a device 102 may send input data requesting alteration of the output of content to a runtime component 126 of a system. For example, a user may utilize a GUI to provide user input requesting an action to be performed in association with content that is being output by the dynamic device group. Example user input may include pressing a portion of the display 120 associated with a pause element, a play element, a "next song" element, a "previous song" element, a volume element etc. Other example user input may not be associated with the content that is being currently output. For example, the dynamic device group may be outputting Song A, and the user may utilize the GUI to search for songs by a different artist while Song A is being output. The GUI may display search results and the user may select Song B for output, indicating an intent to cause the dynamic device group to cease outputting Song A and start outputting Song B.

At block 304, the runtime component 126 may send an event indication to a context component 128. For example, the runtime component 126 may receive event data from an inbound gateway component and may query the context component 128 for contextual data associated with the dynamic device group and/or a device state of the device 102 that received the input.

At block 306, the context component 128 may determine one or more dynamic device groups associated with the device 102. For example, the context component 128 may be configured to determine, such as by utilizing a device identifier associated with the device 102 that received the input, a dynamic device group that is associated with the device 102 when the user input was received. As outlined above, this dynamic device group may differ from a static device group in that the static device group may be created by the user prior to output of the content in question, such as when a user makes a "sound system" group with several devices in a given room associated with the group. This group may persist in association with account data for the user and may not be altered unless a user requests that the group be altered. A dynamic device group may be a device group that is generated on the fly while content is being output and without a user specifically requesting that a persisting group be created. For example, when content is output on the first device 102 and then the user requests that the content be output as well on the second device, a dynamic device group with the first device 102 and the second device may be generated. The context component 128 may be configured to determine the devices belonging to the dynamic device group at the time when the user input is provided.

At block 308, the context component 128 may also determine the device state of the device 102. For example, the context component 128 may be utilized to determine a current device state of the device 102 that received the user input, such as which content is being output, volume settings, whether content is currently being output, etc.

At block 310, the runtime component 126 may send the event indication and/or a task identifier to the application 130. It should be understood that while block 310 is shown as being performed after block 306 and block 308, the operations of block 310 may be performed in parallel to those of block 306 and block 308. For example, while the contextual data is being determined by the context component 128, the system 106 may also send the event data to an orchestrator, which may determine an application 130 that is configured to handle the event type associated with the event data.

At block 312, the application 130 may request target devices from the target determination component 132. For example, the application 130 may have the data needed to determine the action to be performed, such as causing the content to be paused, causing the content to be played, causing a "next song" to be output, etc. However, the application 130 may not have the data needed to determine what target devices to cause the action to be performed on. To determine the target devices, the application may query the target determination component 132 for indicators of the target devices.

At block 314, the target determination component 132 may query the context component 128 for identifier of the target devices. For example, the target determination component 132 may query the context component 128 for the contextual data it generated while the runtime component 126 was communicating with the application 130. By performing the contextual data determination in parallel with requesting the action from the application 130, latency between when the user provides input and when the action is taken may be decreased.

At block 316, the context component 128 may return context data indicating the devices associated with the dynamic device group of the first device 102 to the target determination component 132.

At block 318, the target determination component 132 may send indicators of the target devices to the application 130. The indicators may identify the devices associated with the dynamic device group at the time when the user input data was received.

At block 320, the application may send a command to the runtime component 126. For example, the application 130 may have determined the action to be performed and may determine the target devices that are to perform the action.

At block 322, the runtime component 126 may send the command to the one or more devices associated with the dynamic device group, which may cause the devices to perform the action associated with the command.

Figure 4:
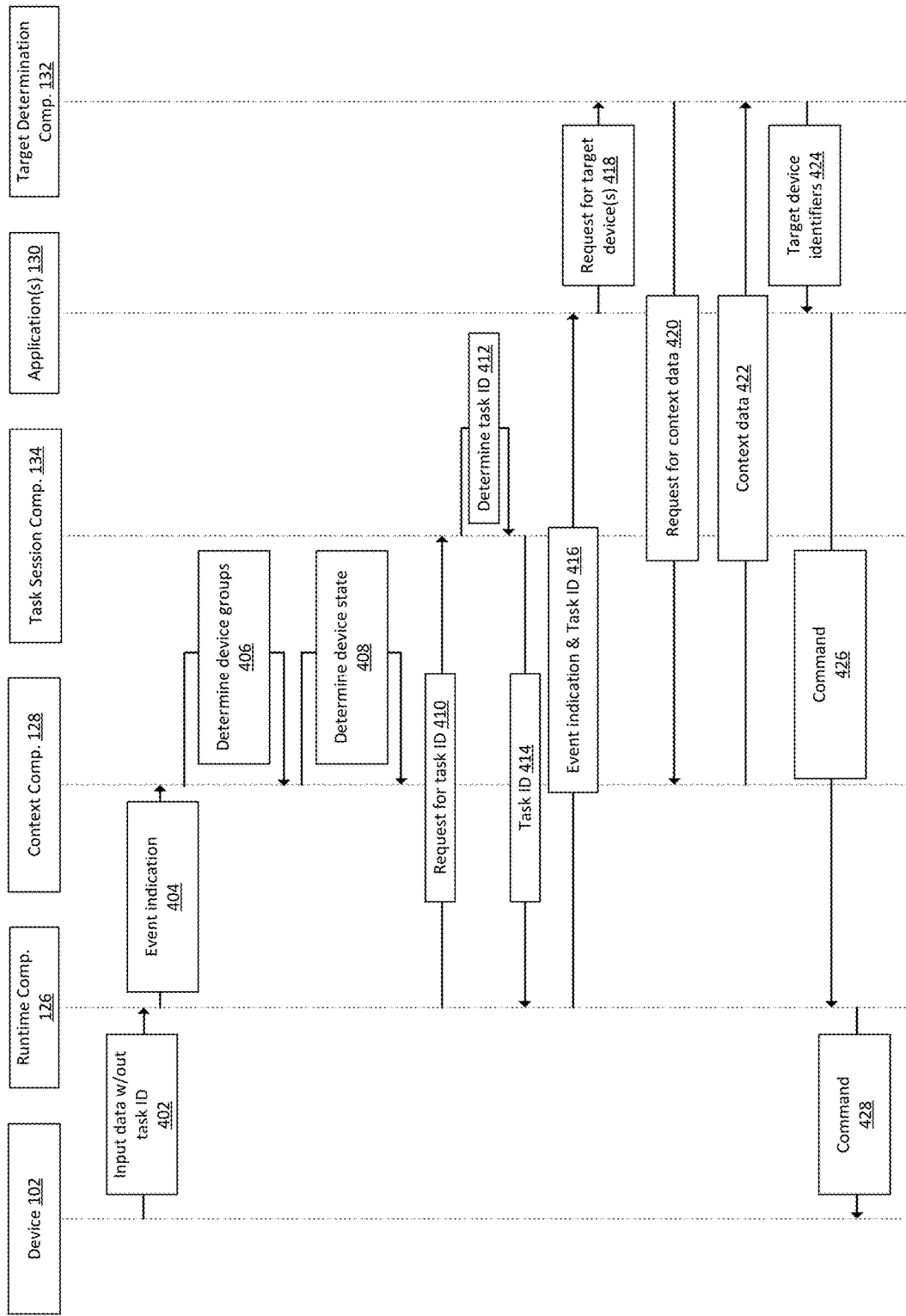
FIG. 4 illustrates a sequence diagram showing an example process for contextual awareness in dynamic device groups where a task identifier is not provided by the requesting device.

FIG. 4 illustrates a sequence diagram showing an example process for contextual awareness in dynamic device groups where a task identifier is not provided by the requesting device. While the sequence diagram depicts the performance of operations and/or the transmission of certain data in a sequential manner, the operations may be performed in a different order than the order depicted in FIG. 4 and/or at least a portion of the operations may be performed in parallel.

At block 402, input data that does not include a task identifier may be received at a runtime component 126 from a device 102. For example, a user may utilize a GUI to provide user input requesting an action to be performed in association with content that is being output by the dynamic device group. Example user input may include pressing a portion of the display 120 associated with a pause element, a play element, a "next song" element, a "previous song" element, a volume element etc. Other example user input may not be associated with the content that is being currently output. For example, the dynamic device group may be outputting Song A, and the user may utilize the GUI to search for songs by a different artist while Song A is being output. The GUI may display search results and the user may select Song B for output, indicating an intent to cause the dynamic device group to cease outputting Song A and start outputting Song B.

At block 404, the runtime component 126 may send an event indication associated with the input data to a context component 128. For example, the runtime component 126 may receive event data from an inbound gateway component and may query the context component 128 for contextual data associated with the dynamic device group and/or a device state of the device 102 that received the input.

At block 406, the context component 128 may determine one or more device groups associated with the device 102 when the input data was received. For example, the context component 128 may be configured to determine, such as by utilizing a device identifier associated with the device 102 that received the input, a dynamic device group that is associated with the device 102 when the user input was received. As outlined above, this dynamic device group may differ from a static device group in that the static device group may be created by the user prior to output of the content in question, such as when a user makes a "sound system" group with several devices in a given room associated with the group. This group may persist in association with account data for the user and may not be altered unless a user requests that the group be altered. A dynamic device group may be a device group that is generated on the fly while content is being output and without a user specifically requesting that a persisting group be created. For example, when content is output on the first device 102 and then the user requests that the content be output as well on the second device, a dynamic device group with the first device 102 and the second device may be generated. The context component 128 may be configured to determine the devices belonging to the dynamic device group at the time when the user input is provided.

At block 408, the context component 128 may determine a device state associated with the device 102. For example, the context component 128 may be utilized to determine a current device state of the device 102 that received the user input, such as which content is being output, volume settings, whether content is currently being output, etc.

At block 410, the runtime component 126 may send a request for a task identifier to a task session component 134. In some examples, a task identifier associated with the event, such as "pause output," "play next song," "play content" etc. may be sent by the device 102 to the system 106 as a portion of the input data. However, in other examples, the task identifier may not be sent and/or may be sent in a format that is not readily useable by the system 106. In these examples, the runtime component 126 may request a task identifier from the task session component 134.

At block 412, the task session component 134 may determine the task identifier. For example, the task session component 134 may be configured to utilize the input data that was received to determine what task is to be performed in response to the user input. In examples, the results from the context component 128 may be utilized by the task session component 134 to determine the task identifier. For example, the device state data may be utilized by the task session component 134 to determine what the current state of the device 102 is, what input elements are being displayed, and/or how the input was received at the device 102.

At block 414, the task session component 134 may send the determined task identifier to the runtime component 126.

At block 416, the runtime component 128 may send the event indication and the task identifier to an application 130. It should be understood that while block 416 is shown as being performed after block 406 and block 408, the operations of block 416 may be performed in parallel to those of block 406 and block 408. For example, while the contextual data is being determined by the context component 128, the system may also send the event data to an orchestrator, which may determine an application 130 that is configured to handle the event type associated with the event data.

At block 418, the application 130 may send a request for target devices to a target determination component 132. For example, the application 130 may have the data needed to determine the action to be performed, such as causing the content to be paused, causing the content to be played, causing a "next song" to be output, etc. However, the application 130 may not have the data needed to determine what target devices to cause the action to be performed on. To determine the target devices, the application may query the target determination component 132 for indicators of the target devices.

At block 420, the target determination component 132 may send a request for context data to the context component 128. For example, the target determination component 132 may query the context component 128 for the contextual data it generated while the runtime component 126 was communicating with the application 130. By performing the contextual data determination in parallel with requesting the action from the application 130, latency between when the user provides input and when the action is taken may be decreased.

At block 422, the context component 128 may return the context data to the target determination component 132.

At block 424, the target determination component 132 may send the target device identifiers to the application 130. The indicators may identify the devices associated with the dynamic device group at the time when the user input data was received.

At block 426, the application 130 may generate and send a command responsive to the user input data to the runtime component 126. For example, the application 130 may have determined the action to be performed and may determine the target devices that are to perform the action.

At block 428, the runtime component 126 may send the command to the one or more target devices to cause the devices to perform an action associated with the command.

Figure 5:
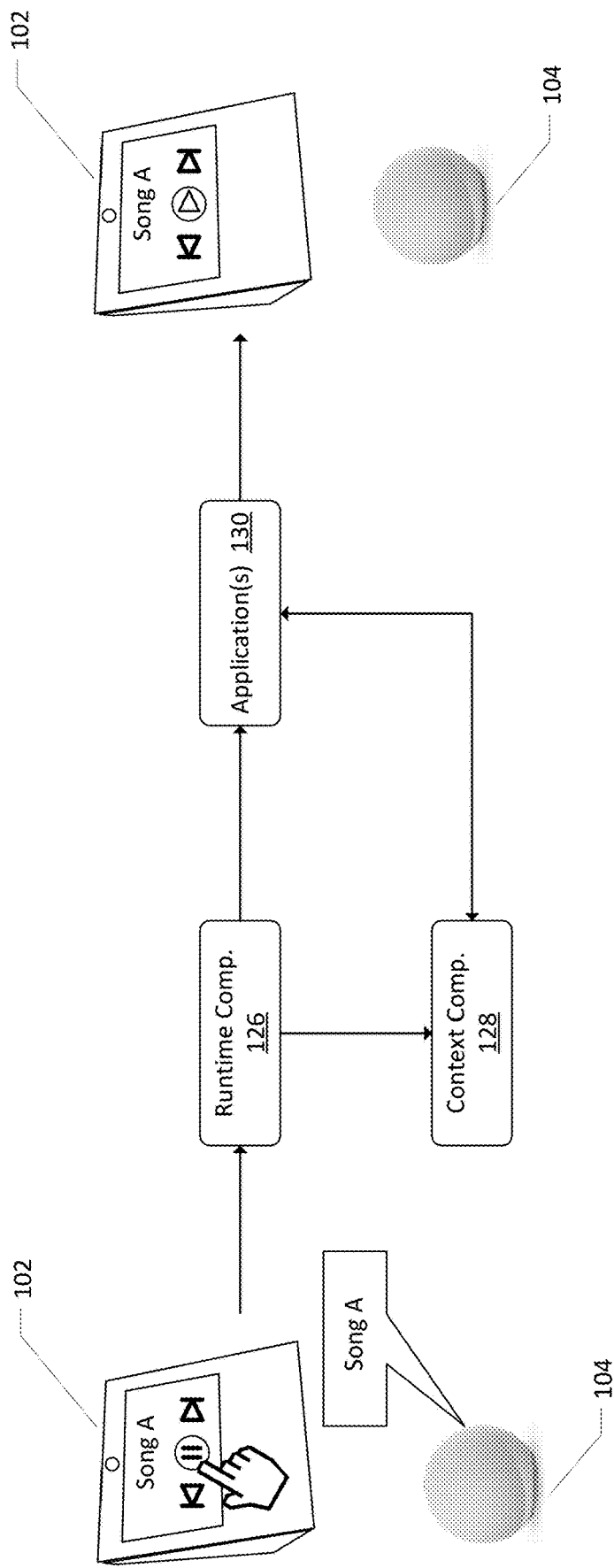
FIG. 5 illustrates a conceptual diagram of example components utilized for content transport control in dynamic device groups.

FIG. 5 illustrates a conceptual diagram of example components utilized for content transport control in dynamic device groups. The components of FIG. 5 may be the same or similar to the components of FIG. 1. For example, FIG. 5 may include a first device 102, a second device 104, a runtime component 126, a context component 128, and/or one or more applications 130. In the example of FIG. 5, user input is received on the first device 102 to cause alteration of the output of the content being currently output by the first device 102 and the second device 104. In this example, the user input is related to the content being output, such as a request to pause audio, play audio, increase and/or decrease volume, play a next song, play a previous song, start a song over, etc.

In this transport control example, the dynamic device group associated with the first device 102 when the user input is received may be determined to generate a command to perform an action associated with the user input, and to have the command carried out by the devices of the dynamic device group.

For example, the dynamic device group may be outputting Song A, and the user may utilize the GUI to indicate a request to pause output of Song A. In these and other examples, the user input may be received at a device gateway, which may be configured to act as a connection proxy between the user devices 102, 104 and a system. An inbound gateway component may receive the input data from the device gateway and may determine an event type associated with the input data, here a pause event type.

Thereafter, the runtime component 126 may receive event data from the inbound gateway component and may query the context component 128 for contextual data associated with the dynamic device group and/or a device state of the device 102 that received the input. For example, the context component may be configured to determine, such as by utilizing a device identifier associated with the device 102 that received the input, a dynamic device group that is associated with the device 102 when the user input was received. As outlined above, this dynamic device group may differ from a static device group in that the static device group may be created by the user prior to output of the content in question, such as when a user makes a "sound system" group with several devices in a given room associated with the group. This group may persist in association with account data for the user and may not be altered unless a user requests that the group be altered. A dynamic device group may be a device group that is generated on the fly while content is being output and without a user specifically requesting that a persisting group be created. For example, when content is output on the first device 102 and then the user requests that the content be output as well on the second device 104, a dynamic device group with the first device 102 and the second device 104 may be generated. The context component 128 may be configured to determine the devices belonging to the dynamic device group at the time when the user input is provided. Additionally, the context component 128 may be utilized to determine a current device state of the device 102 that received the user input, such as which content is being output, volume settings, whether content is currently being output, etc.

While the contextual data is being determined by the context component 128, the system may also send the event data to an orchestrator, which may determine an application 130 that is configured to handle the event type associated with the event data. In some examples, a task identifier associated with the event, such as "pause output" may be sent by the device 102 to the system as a portion of the input data. At this point, the application 130 may have the data needed to determine the action to be performed, such as causing the content to be paused, causing the content to be played, causing a "next song" to be output, etc. However, the application 130 may not have the data needed to determine what target devices to cause the action to be performed on. To determine the target devices, the application may query the target determination component 132 for indicators of the target devices. The target determination component 132 may query the context component 128 for the contextual data it generated while the runtime component 126 was communicating with the application 130. By performing the contextual data determination in parallel with requesting the action from the application 130, latency between when the user provides input and when the action is taken may be decreased. The context component 128 may return an indicator of the devices associated with the dynamic device group when the user input was received to the target determination component 132, which may communicate the target device indicators to the application 130. At this point, the application 130 may have determined the action to be performed and may determine the target devices that are to perform the action. The application 130 may send a command to the target devices to cause the requested action to be performed. It should be understood that the command may be sent to the device 102 that received the user input, to one or more of the other devices 104 in the dynamic device group, and/or to another device that may communicate with the target devices to cause the action to be performed.

Figure 6:
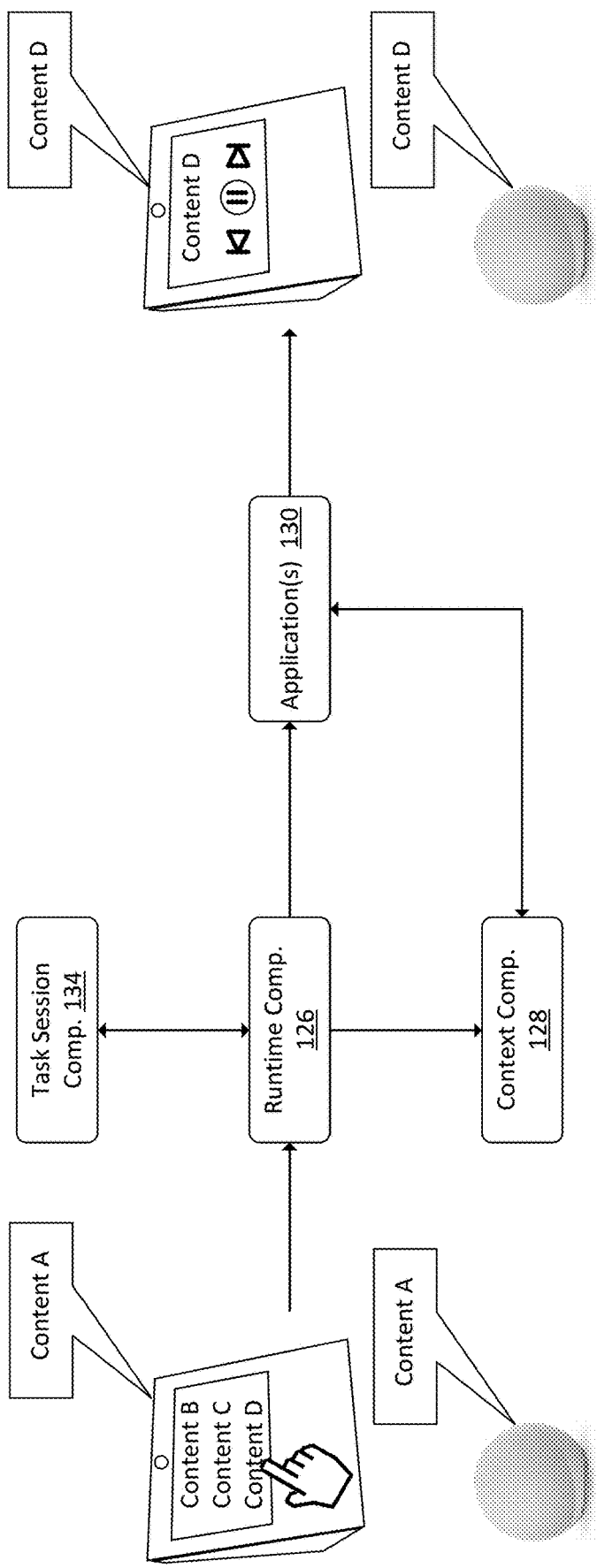
FIG. 6 illustrates a conceptual diagram of example components utilized for preemptory initiation of operations in dynamic device groups.

FIG. 6 illustrates a conceptual diagram of example components utilized for preemptory initiation of operations in dynamic device groups. The components of FIG. 6 may be the same or similar to the components of FIG. 1. For example, FIG. 6 may include a first device 102, a second device 104, a runtime component 126, a context component 128, one or more applications 130, and/or a task session component 134. In the example of FIG. 6, user input is received on the first device 102 to cause alteration of the output of the content being currently output by the first device 102 and the second device 104. In this example, the user input is not related to the content being output, such as a request a new song to be output from a search conducted using the device.

In this "warm start" example, the dynamic device group associated with the first device 102 when the user input is received may be determined to generate a command to perform an action associated with the user input, and to have the command carried out by the devices of the dynamic device group.

For example, the dynamic device group may be outputting Song A, and the user may utilize the GUI to indicate a request to output Song D instead. In these and other examples, the user input may be received at a device gateway, which may be configured to act as a connection proxy between the user devices 102, 104 and a system. An inbound gateway component may receive the input data from the device gateway and may determine an event type associated with the input data, here a pause event type.

Thereafter, the runtime component 126 may receive event data from the inbound gateway component and may query the context component 128 for contextual data associated with the dynamic device group and/or a device state of the device 102 that received the input. For example, the context component may be configured to determine, such as by utilizing a device identifier associated with the device 102 that received the input, a dynamic device group that is associated with the device 102 when the user input was received. As outlined above, this dynamic device group may differ from a static device group in that the static device group may be created by the user prior to output of the content in question, such as when a user makes a "sound system" group with several devices in a given room associated with the group. This group may persist in association with account data for the user and may not be altered unless a user requests that the group be altered. A dynamic device group may be a device group that is generated on the fly while content is being output and without a user specifically requesting that a persisting group be created. For example, when content is output on the first device 102 and then the user requests that the content be output as well on the second device 104, a dynamic device group with the first device 102 and the second device 104 may be generated. The context component 128 may be configured to determine the devices belonging to the dynamic device group at the time when the user input is provided. Additionally, the context component 128 may be utilized to determine a current device state of the device 102 that received the user input, such as which content is being output, volume settings, whether content is currently being output, etc.

While the contextual data is being determined by the context component 128, the system may also send the event data to an orchestrator, which may determine an application 130 that is configured to handle the event type associated with the event data. In some examples, a task identifier associated with the event, such as "play Song D" may be sent by the device 102 to the system as a portion of the input data. However, in other examples, the task identifier may not be sent and/or may be sent in a format that is not readily useable by the system 106. In these examples, the orchestrator may request a task identifier from the task session component 134. The task session component 134 may be configured to utilize the input data that was received to determine what task is to be performed in response to the user input. In examples, the results from the context component 128 may be utilized by the task session component 134 to determine the task identifier. For example, the device state data may be utilized by the task session component 134 to determine what the current state of the device 102 is, what input elements are being displayed, and/or how the input was received at the device 102. The task session component 134 may return the task identifier to the orchestrator, which may communicate with an application gateway to request the application 130 to determine an action to be performed in response to the user input.

At this point, the application 130 may have the data needed to determine the action to be performed, such as causing the content to be paused, causing the content to be played, causing a "next song" to be output, etc. However, the application 130 may not have the data needed to determine what target devices to cause the action to be performed on. To determine the target devices, the application may query the target determination component 132 for indicators of the target devices. The target determination component 132 may query the context component 128 for the contextual data it generated while the runtime component 126 was communicating with the application 130. By performing the contextual data determination in parallel with requesting the action from the application 130, latency between when the user provides input and when the action is taken may be decreased. The context component 128 may return an indicator of the devices associated with the dynamic device group when the user input was received to the target determination component 132, which may communicate the target device indicators to the application 130. At this point, the application 130 may have determined the action to be performed and may determine the target devices that are to perform the action. The application 130 may send a command to the target devices to cause the requested action to be performed. It should be understood that the command may be sent to the device 102 that received the user input, to one or more of the other devices 104 in the dynamic device group, and/or to another device that may communicate with the target devices to cause the action to be performed.

Figure 7:
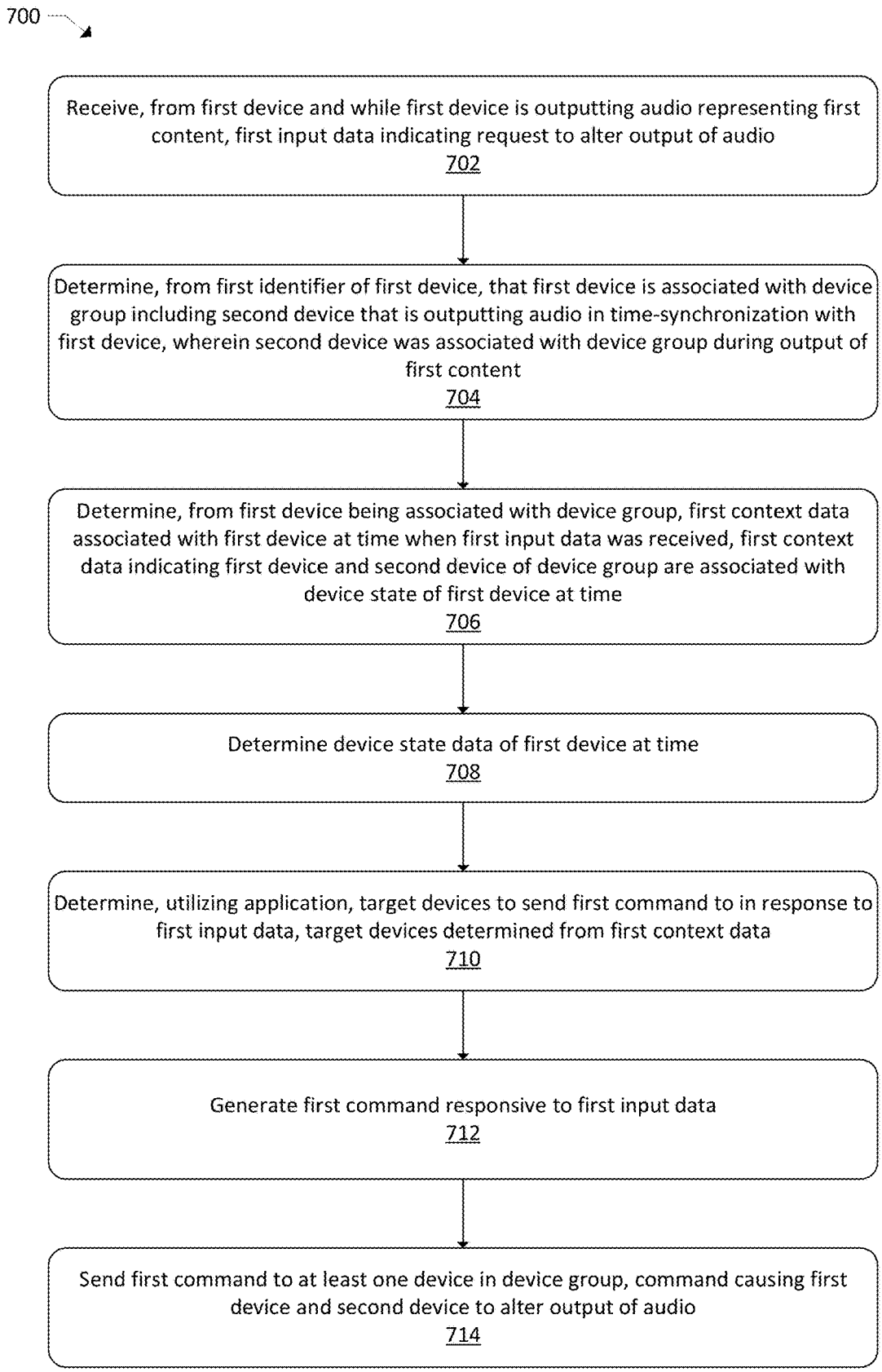
FIG. 7 illustrates a flow diagram of an example process for contextual awareness in dynamic device groups.
Figure 8:
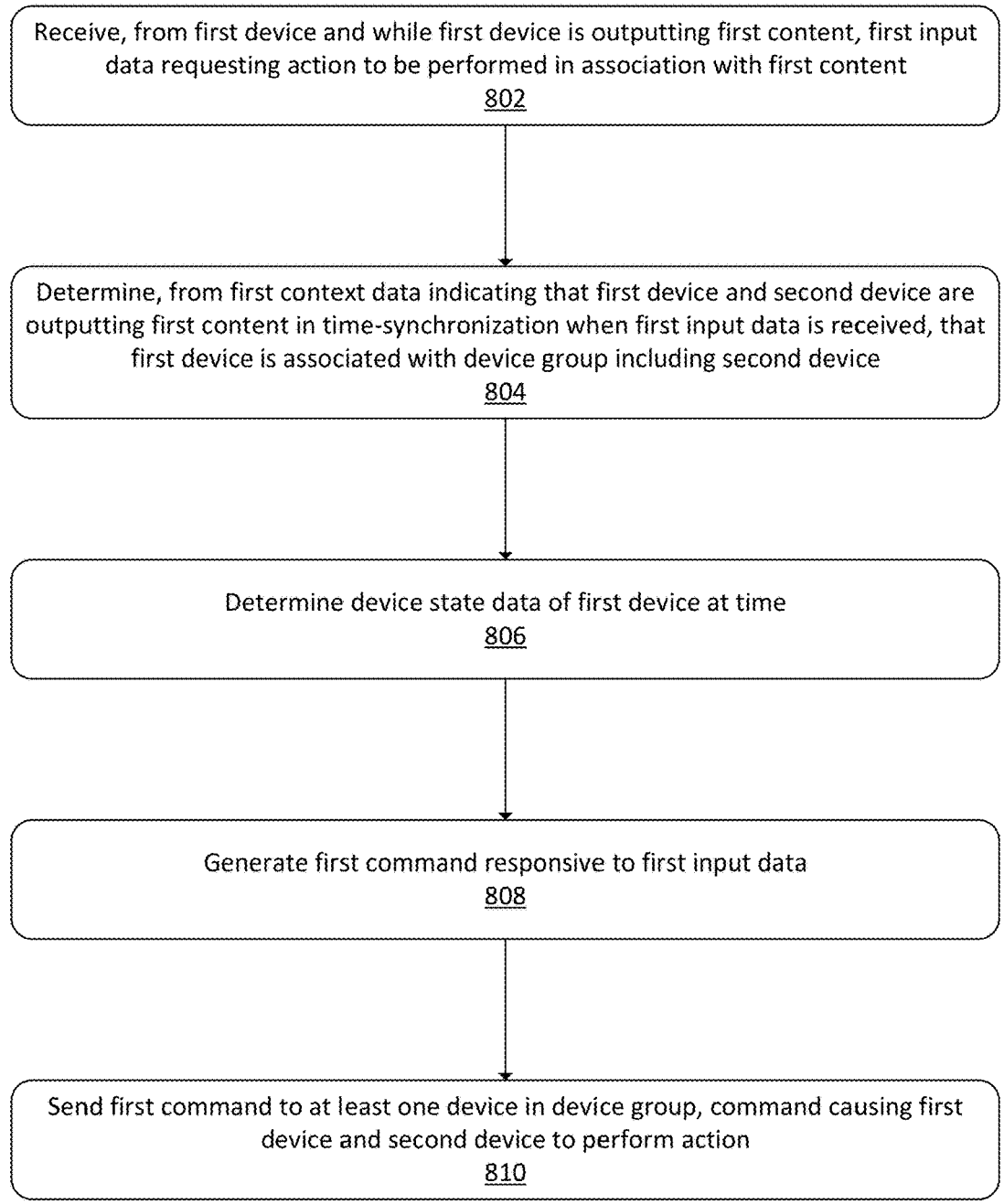
FIG. 8 illustrates a flow diagram of another example process for contextual awareness in dynamic device groups.

FIGS. 7 & 8 illustrate processes for contextual awareness in dynamic device groups. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1-6 and 9A-11, although the processes may be implemented in a wide variety of other environments, architectures and systems.

FIG. 7 illustrates a flow diagram of an example process 700 for contextual awareness in dynamic device groups. The order in which the operations or steps are described is not intended to be construed as a limitation, and any number of the described operations may be combined in any order and/or in parallel to implement process 700.

At block 702, the process 700 may include receiving, from a first device and while the first device is outputting audio representing first content, first input data indicating a request to alter output of the audio. For example, a first device may initiate output of content, and then a second device may be added to the device group such that the second device may also output the content. A user may utilize a GUI to provide user input requesting an action to be performed in association with content that is being output by the dynamic device group. Example user input may include pressing a portion of the display associated with a pause element, a play element, a "next song" element, a "previous song" element, a volume element etc. Other example user input may not be associated with the content that is being currently output. For example, the dynamic device group may be outputting Song A, and the user may utilize the GUI to search for songs by a different artist while Song A is being output. The GUI may display search results and the user may select Song B for output, indicating an intent to cause the dynamic device group to cease outputting Song A and start outputting Song B.

At block 704, the process 700 may include determining, from a first identifier of the first device, that the first device is associated with a device group including a second device that is outputting the audio in time-synchronization with the first device, wherein the second device was associated with the device group during output of the first content. For example, a context component may receive the device identifier of the device that received the input, and may determine that the device is associated with at least one dynamic device group.

At block 706, the process 700 may include determining, from the first device being associated with the device group, first context data associated with the first device at a time when the first input data was received, the first context data indicating the first device and the second device of the device group are associated with a device state of the first device at the time. For example, the context component may be configured to determine, such as by utilizing a device identifier associated with the device that received the input, a dynamic device group that is associated with the device when the user input was received. As outlined above, this dynamic device group may differ from a static device group in that the static device group may be created by the user prior to output of the content in question, such as when a user makes a "sound system" group with several devices in a given room associated with the group. This group may persist in association with account data for the user and may not be altered unless a user requests that the group be altered. A dynamic device group may be a device group that is generated on the fly while content is being output and without a user specifically requesting that a persisting group be created. For example, when content is output on a first device and then the user requests that the content be output as well on a second device, a dynamic device group with the first device and the second device may be generated. The context component may be configured to determine the devices belonging to the dynamic device group at the time when the user input is provided.

At block 708, the process 700 may include determining device state data of the first device at the time. For example, the context component may be utilized to determine a current device state of the device that received the user input, such as which content is being output, volume settings, whether content is currently being output, etc.

At block 710, the process 700 may include determining, utilizing an application associated with provision of the first content, target devices to send a first command to in response to the first input data, the target devices determined from the first context data. For example, to determine the target devices, the application may query a target determination component for indicators of the target devices. The target determination component may query the context component for the contextual data it generated while the runtime component was communicating with the application. By performing the contextual data determination in parallel with requesting the action from the application, latency between when the user provides input and when the action is taken may be decreased. The context component may return an indicator of the devices associated with the dynamic device group when the user input was received to the target determination component, which may communicate the target device indicators to the application.

At block 712, the process 700 may include generating the first command responsive to the first input data. For example, at this point, the application may have determined the action to be performed and may determine the target devices that are to perform the action.

At block 714, the process 700 may include sending the first command to at least one device in the device group, the command causing the first device and the second device to alter output of the audio. For example, the application may send a command indicating the action to be performed to the runtime component, which may communicate the command to the target devices to cause the requested action to be performed. It should be understood that the command may be sent to the device that received the user input, to one or more of the other devices in the dynamic device group, and/or to another device that may communicate with the target devices to cause the action to be performed.

Additionally, or alternatively, the process 700 may include receiving, from the first device and while the first device is outputting the audio representing the first content, second input data requesting output of second content instead of the first content, the second input data corresponding to second input received at the GUI, the second content being unassociated with the first content. The process 700 may also include determining that the first device is associated with the device group when the second input data is received. The process 700 may also include determining, from the first device being associated with the device group, second context data of the first device when the second input data was received, the second context data indicating devices associated with the device group when the second input data was received. The process 700 may also include sending, utilizing the second context data, a second command configured to cause the devices associated with the device group when the second input data was received to output the second content instead of the first content.

Additionally, or alternatively, the process 700 may include querying the application for the first command while the first context data and the device state data is being determined. The process 700 may also include determining, by the application, a first portion of the command while the first context data and the device state data is being determined, the first portion of the command indicating an action to be performed in association with the first content. The process 700 may also include storing the first context data in association with a session identifier. The process 700 may also include determining, by the application, a second portion of the command from the first context data as identified utilizing the session identifier, the second portion of the command indicating the target devices.

Additionally, or alternatively, the process 700 may include determining that a task identifier was absent from the first input data received from the first device. The process 700 may also include determining, utilizing the first context data and the first input data, the task identifier to associate with the request. In these examples, generating the first command may be performed utilizing the task identifier.

Additionally, or alternatively, the process 700 may include determining, from presence data, that a user has moved from a first environment associated with the first device to a second environment associated with a third device. The process 700 may also include causing the third device to be associated with the device group in response to the user moving to the second environment. The process 700 may also include receiving, from the third device, second input data requesting alteration of output of the audio. The process 700 may also include sending, from the third device being associated with the device group, a second command configured to cause the first device, the second device, and the third device to alter output of the audio.

FIG. 8 illustrates a flow diagram of another example process 800 for contextual awareness in dynamic device groups. The order in which the operations or steps are described is not intended to be construed as a limitation, and any number of the described operations may be combined in any order and/or in parallel to implement process 800.

At block 802, the process 800 may include receiving, from a first device and while the first device is outputting first content, first input data requesting an action to be performed in association with the first content. For example, a first device may initiate output of content, and then a second device may be added to the device group such that the second device may also output the content. A user may utilize a GUI to provide user input requesting an action to be performed in association with content that is being output by the dynamic device group. Example user input may include pressing a portion of the display associated with a pause element, a play element, a "next song" element, a "previous song" element, a volume element etc. Other example user input may not be associated with the content that is being currently output. For example, the dynamic device group may be outputting Song A, and the user may utilize the GUI to search for songs by a different artist while Song A is being output. The GUI may display search results and the user may select Song B for output, indicating an intent to cause the dynamic device group to cease outputting Song A and start outputting Song B.

At block 804, the process 800 may include determining, from first context data indicating that the first device and a second device are outputting the first content in time-synchronization when the first input data is received, that the first device is associated with a device group including the second device. For example, the context component may be configured to determine, such as by utilizing a device identifier associated with the device that received the input, a dynamic device group that is associated with the device when the user input was received. As outlined above, this dynamic device group may differ from a static device group in that the static device group may be created by the user prior to output of the content in question, such as when a user makes a "sound system" group with several devices in a given room associated with the group. This group may persist in association with account data for the user and may not be altered unless a user requests that the group be altered. A dynamic device group may be a device group that is generated on the fly while content is being output and without a user specifically requesting that a persisting group be created. For example, when content is output on a first device and then the user requests that the content be output as well on a second device, a dynamic device group with the first device and the second device may be generated. The context component may be configured to determine the devices belonging to the dynamic device group at the time when the user input is provided.

At block 806, the process 800 may include determining device state data of the first device at the time. For example, the context component may be utilized to determine a current device state of the device that received the user input, such as which content is being output, volume settings, whether content is currently being output, etc.

At block 808, the process 800 may include generating a first command responsive to the first input data. For example, at this point, the application may have determined the action to be performed and may determine the target devices that are to perform the action.

At block 810, the process 800 may include sending the first command to at least one device in the device group, the command causing the first device and the second device to perform the action. For example, at this point, the application may have determined the action to be performed and may determine the target devices that are to perform the action.

Additionally, or alternatively, the process 800 may include receiving, from the first device and while the first device is outputting the first content, second input data requesting output of second content instead of the first content, the second content being unassociated with the first content. The process 800 may also include determining second context data of the first device when the second input data was received, the second context data indicating devices associated with the device group when the second input data was received. The process 800 may also include sending, based at least in part on the second context data, a second command configured to cause the devices associated with the device group when the second input data was received to output the second content instead of the first content.

Additionally, or alternatively, the process 800 may include determining a first portion of the first command while the first context data and the device state data is being determined, the first portion of the first command indicating an action to be performed. The process 800 may also include storing the first context data in association with a session identifier. The process 800 may also include determining a second portion of the first command from the first context data as identified utilizing the session identifier, the second portion of the first command indicating the target devices.

Additionally, or alternatively, the process 800 may include determining that a task identifier was absent from the first input data. The process 800 may also include determining, based at least in part on the first context data and the first input data, the task identifier to associate with the request. In these examples, generating the first command may be performed utilizing the task identifier.

Additionally, or alternatively, the process 800 may include generating a context identifier associated with the first context data. The process 800 may also include associating the context identifier with the first user input such that the first context data is approved for use in association with the first input data. The process 800 may also include receiving second input data requesting alteration of output of the first content. The process 800 may also include determining to refrain from utilizing the first context data in association with the second input data based at least in part on the context identifier being associated with the first input data instead of the second input data.

Additionally, or alternatively, the process 800 may include receiving, from the first device, a task identifier associated with the action to be performed. The process 800 may also include sending, while the first context data is being determined, the task identifier to an application configured to determine the first command. In these examples, generating the first command may be based at least in part on the task identifier and the first context data.

Additionally, or alternatively, the process 800 may include examples where the first content is initially output by the second device, the device group is generated while the first content is output and based at least in part on receiving first user input requesting that the first device also output the first content, and/or input representing the first input data was received at a graphical user interface of the first device while the first device and the second device output the first content.

Additionally, or alternatively, the process 800 may include generating a second command configured to cause display of information associated with the first content once the first command is performed. The process 800 may also include determining the devices of the device group to send the second command to based at least in part on the first context data. The process 800 may also include sending the second command to the devices of the device group.

Additionally, or alternatively, the process 800 may include determining, from data indicating presence detection, that a user has moved from a first environment associated with the first device to a second environment associated with a third device. The process 800 may also include causing the third device to be associated with the device group based at least in part on determining that the user has moved to the second environment. The process 800 may also include receiving, from the third device, second input data requesting alteration of output of the first content. The process 800 may also include sending, based at least in part on the third device being associated with the device group, a second command configured to cause the first device, the second device, and the third device to alter output of the first content.

Additionally, or alternatively, the process 800 may include determining, from data indicating presence detection, that a user has moved from a first environment associated with the first device to a second environment associated with a third device. The process 800 may also include causing the third device to be associated with the device group based at least in part on determining that the user has moved to the second environment. The process 800 may also include determining that presence of the user is detected in the second environment for at least a threshold amount of time. The process 800 may also include causing the first device to be dissociated from the device group based at least in part on the presence of the user being detected in the second environment for the at least the threshold amount of time. The process 800 may also include receiving, from the third device, second input data requesting alteration of output of the first content. The process 800 may also include sending, based at least in part on the third device being associated with the device group, a second command configured to cause the second device and the third device to alter output of the first content.

Figure 9A:
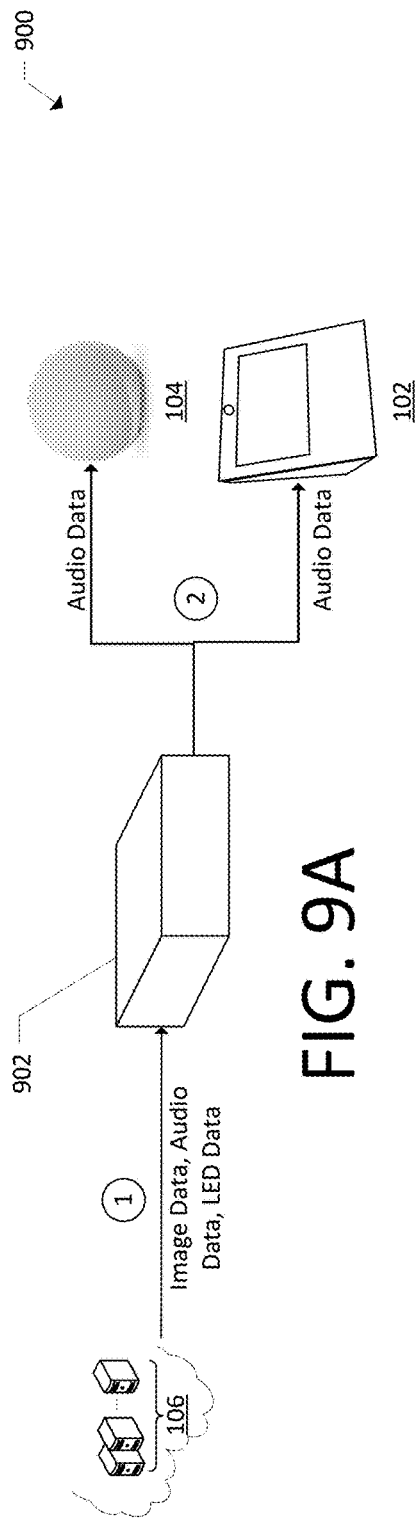
FIG. 9A illustrates a conceptual diagram of example devices utilized for outputting audio in a time-synchronous manner with each other where the audio data is received from a remote system.

FIG. 9A illustrates a conceptual diagram of example devices utilized for outputting audio in a time-synchronous manner with each other and/or with display of images. The system 900 may include at least some of the components of the system 100 from FIG. 1. For example, the system 900 may include an distribution device 902 and/or one or more output devices 102, 104 and/or a remote system 106. FIG. 9A depicts the exchange of information and/or the performance of processes via the various components utilizing steps 1 and 2. However, it should be understood that the processes may be performed in any order and need not be performed in sequential order as depicted in FIG. 9A.

At step 1, content data, such as image data, audio data, and/or light emitting diode (LED) data, may be sent from the remote system 106 to the distribution device 902. By way of example, a user may request that content may be displayed and/or otherwise output utilizing devices located in an environment. The request may be from user input to, for example, a personal device such as a mobile phone, tablet, and/or computer, and/or the request may be from a user utterance spoken by the user and captured by a microphone of one or more of the devices within the environment. For example, a user may provide input indicating an intent to play a video associated with a movie on a television within the environment while one or more other devices output audio of the movie. Input data corresponding to the input may be sent to, for example, the remote system 106 configured to retrieve content associated with the request. In examples where the input comprises a user utterance, audio data corresponding to the user utterance may be sent to the remote system 106. A speech-processing system may generate intent data indicating an intent associated with the user utterance. In the example where the user utterance indicates an intent to output content on the one or more devices, a speechlet may receive the intent data and/or a payload associated with the intent data and may utilize that information to determine what content is to be provided to the distribution device 902 for output. A retrieval component may retrieve the requested content and the remote system 106 may send the content to the distribution device 902. The content, in a given example may include image data and audio data. In other examples, the content may include just image data, just audio data, and/or other types of data.

At step 2, the distribution device 902 may send data packets, such as audio-data packets to the output devices 102, 104. For example, the distribution device 902 may receive the content data and may send all or a portion of the content data to the output devices 102, 104. In these examples, the data may be sent to the output devices 102, 104 as data packets utilizing one or more protocols.

The distribution device 902 and/or the output devices 102, 104 may utilize the context data as described herein to determine what commands are to be sent to the various devices 102, 104 such that the video is output by a device having a video interface in a time-synchronous manner with output of the audio on the an audio-output device.

Figure 9B:
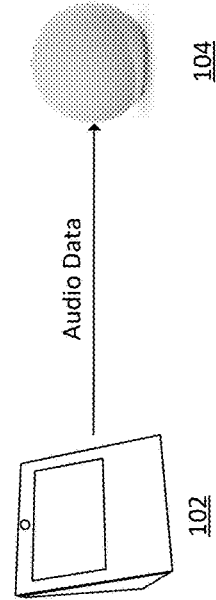
FIG. 9B illustrates a conceptual diagram of example devices utilized for outputting audio where one device sends an instance of audio data to another device for output in a time-synchronous manner.

FIG. 9B illustrates a conceptual diagram of example devices utilized for outputting audio where one device sends an instance of audio data to another device for output in a time-synchronous manner. The system 900 may include at least some of the components of the system 100 from FIG. 1. For example, the system 900 may include one or more devices 102, 104.

A user may request that content may be output utilizing devices located in an environment. The request may be from user input to, for example, a personal device such as a mobile phone, tablet, and/or computer, and/or the request may be from a user utterance spoken by the user and captured by a microphone of one or more of the devices within the environment. For example, a user may provide input indicating an intent to play a song on devices 102, 104 within the environment. Input data corresponding to the input may be sent to, for example, a remote system configured to retrieve content associated with the request. In other examples, the content that is requested may already be downloaded to or otherwise accessible to the device 102. In examples where the input comprises a user utterance, a speech-processing system may generate intent data indicating an intent associated with the user utterance. In the example where the user utterance indicates an intent to output content on the one or more devices 102, 104, a speechlet may receive the intent data and/or a payload associated with the intent data and may utilize that information to determine what content is to be provided.

The device 102 may send data packets, such as audio-data packets to the device 104. For example, the device 102 may receive the content data and may send all or a portion of the content data to the device 104. In these examples, the data may be sent to the device 104 as data packets utilizing one or more protocols. The device 102 and/or the device 104 may utilize associations between time kept by the devices 102, 104 to determine how and when to send packets to the device 104 such that the audio is output by the device 102 in a time-synchronous manner with output of the audio on the device 104.

Figure 9C:
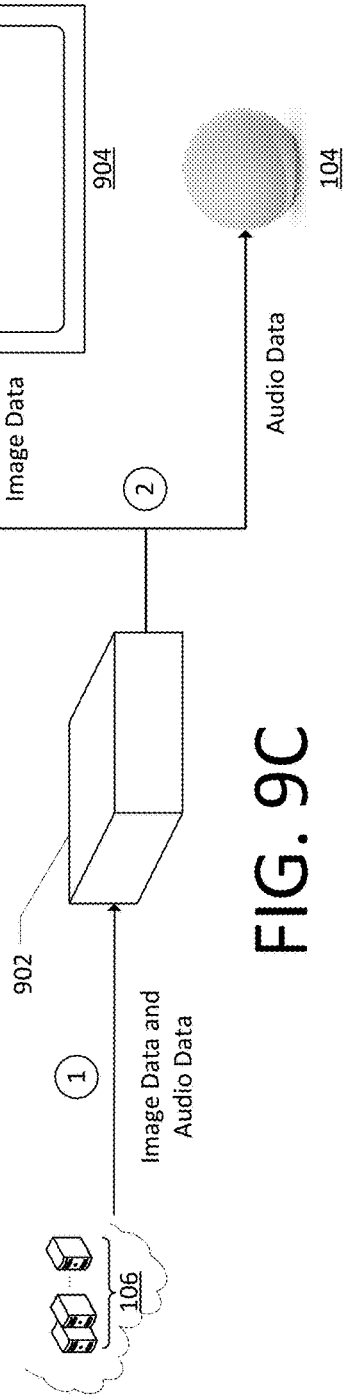
FIG. 9C illustrates a conceptual diagram of examples devices utilized for outputting audio and video in a time-synchronous manner.

FIG. 9C illustrates a conceptual diagram of examples devices utilized for outputting audio and video in a time-synchronous manner. The system 900 may include at least some of the components of the system 100 from FIG. 1. For example, the system 900 may include an distribution device 902 and/or a video interface device 904 and/or an audio-output device 104. FIG. 9 depicts the exchange of information and/or the performance of processes via the various components utilizing steps 1 and 2. However, it should be understood that the processes may be performed in any order and need not be performed in sequential order as depicted in FIG. 9.

At step 1, content data, such as image data and audio data, may be sent from the remote system 106 to the distribution device 902. By way of example, a user may request that content may be displayed and/or otherwise output utilizing devices located in an environment. The request may be from user input to, for example, a personal device such as a mobile phone, tablet, and/or computer, and/or the request may be from a user utterance spoken by the user and captured by a microphone of one or more of the devices within the environment. For example, a user may provide input indicating an intent to play a video associated with a movie on a television within the environment while one or more other devices output audio of the movie. Input data corresponding to the input may be sent to, for example, the remote system 106 configured to retrieve content associated with the request. In examples where the input comprises a user utterance, audio data corresponding to the user utterance may be sent to the remote system 106. A speech-processing system may generate intent data indicating an intent associated with the user utterance. In the example where the user utterance indicates an intent to output content on the one or more devices, a speechlet may receive the intent data and/or a payload associated with the intent data and may utilize that information to determine what content is to be provided to the distribution device 902 for output. A retrieval component may retrieve the requested content and the remote system 106 may send the content to the distribution device 902. The content, in a given example may include image data and audio data. In other examples, the content may include just image data, just audio data, and/or other types of data.

At step 2, the distribution device 902 may send data packets, such as audio-data packets to the audio-output device 104, and image-data packets to the video interface device 904. For example, the distribution device 902 may receive the content data and may send all or a portion of the content data to the video interface device 904 and/or the audio-output device 102. In these examples, the data may be sent to the devices 904, 104 as data packets utilizing one or more protocols.

The distribution device 902 and/or the devices 904, 104 may utilize associations between time kept by the distribution device 902 and time kept by the devices 904, 104 to determine how and when to send packets to the devices 904, 104 such that the video is output by the video interface device 904 and/or another device having a video interface in a time-synchronous manner with output of the audio on the audio-output device 104.

Figure 10:
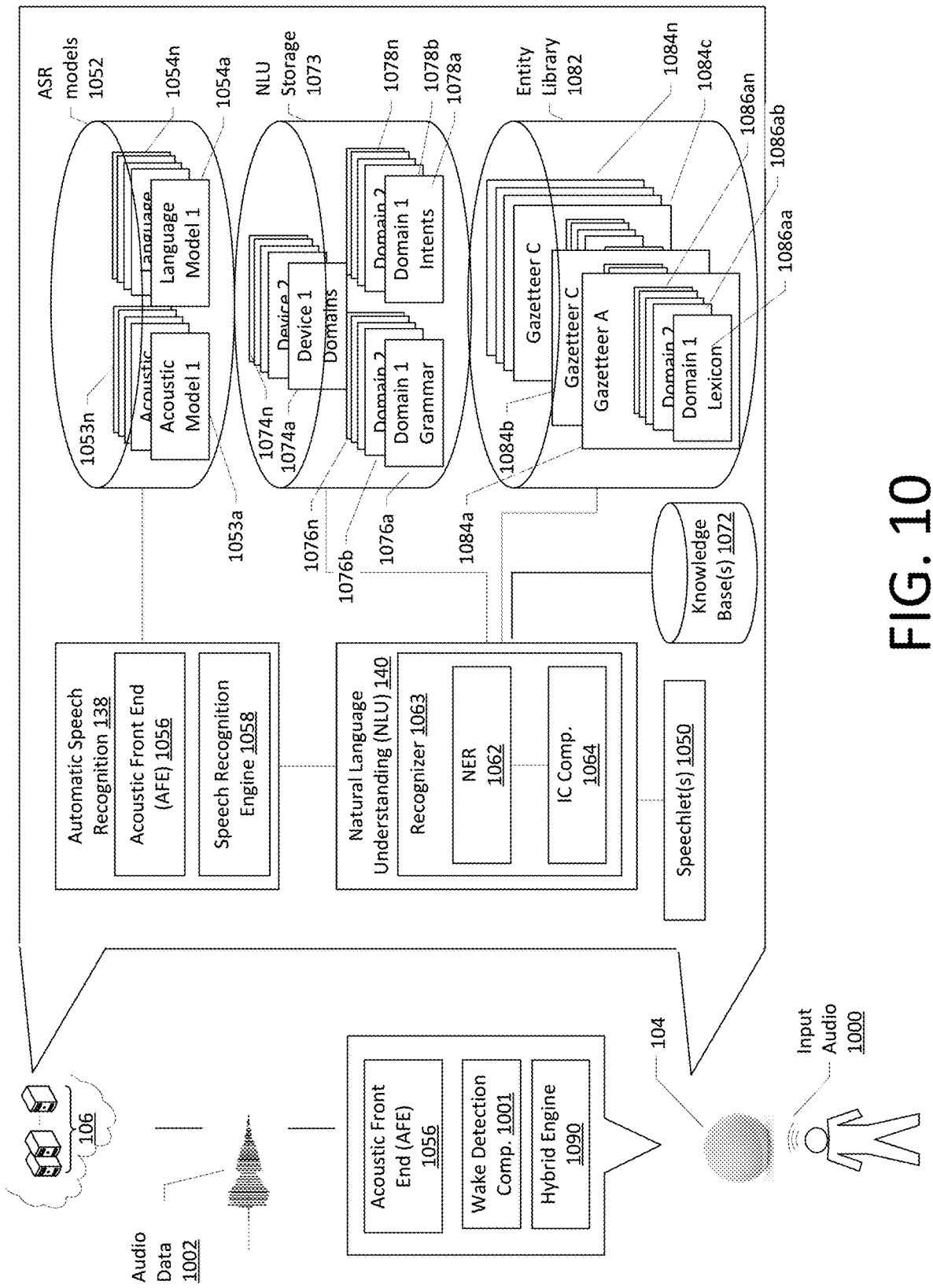
FIG. 10 illustrates a conceptual diagram of components of a speech-processing system for processing audio data provided by one or more devices.

FIG. 10 illustrates a conceptual diagram of how a spoken utterance can be processed, allowing a system to capture and execute commands spoken by a user, such as spoken commands that may follow a wakeword, or trigger expression, (i.e., a predefined word or phrase for "waking" a device, causing the device to begin processing audio data). The various components illustrated may be located on a same device or different physical devices. Message between various components illustrated in FIG. 10 may occur directly or across a network 106. An audio capture component, such as a microphone 116 of the device 102, or another device, captures audio 1000 corresponding to a spoken utterance. The device 102, using a wake word engine 1001, then processes audio data corresponding to the audio 1000 to determine if a keyword (such as a wakeword) is detected in the audio data. Following detection of a wakeword, the device 102 processes audio data 1002 corresponding to the utterance utilizing an ASR component 138. The audio data 1002 may be output from an optional acoustic front end (AFE) 1056 located on the device prior to transmission. In other instances, the audio data 1002 may be in a different form for processing by a remote AFE 1056, such as the AFE 1056 located with the ASR component 138.

The wake word engine 1001 works in conjunction with other components of the user device, for example a microphone to detect keywords in audio 1000. For example, the device may convert audio 1000 into audio data, and process the audio data with the wake word engine 1001 to determine whether human sound is detected, and if so, if the audio data comprising human sound matches an audio fingerprint and/or model corresponding to a particular keyword.

The user device may use various techniques to determine whether audio data includes human sound. Some embodiments may apply voice activity detection (VAD) techniques. Such techniques may determine whether human sound is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the user device may implement a limited classifier configured to distinguish human sound from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in human sound storage, which acoustic models may include models corresponding to human sound, noise (such as environmental noise or background noise), or silence. Still other techniques may be used to determine whether human sound is present in the audio input.

Once human sound is detected in the audio received by user device (or separately from human sound detection), the user device may use the wake-word component 1001 to perform wakeword detection to determine when a user intends to speak a command to the user device. This process may also be referred to as keyword detection, with the wakeword being a specific example of a keyword. Specifically, keyword detection may be performed without performing linguistic analysis, textual analysis or semantic analysis. Instead, incoming audio (or audio data) is analyzed to determine if specific characteristics of the audio match preconfigured acoustic waveforms, audio fingerprints, or other data to determine if the incoming audio "matches" stored audio data corresponding to a keyword.

Thus, the wake word engine 1001 may compare audio data to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds hidden Markov models (HMM) for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating hybrid DNN-HMM decoding framework. In another embodiment, the wakeword spotting system may be built on deep neural network (DNN)/recursive neural network (RNN) structures directly, without HMM involved. Such a system may estimate the posteriors of wakewords with context information, either by stacking frames within a context window for DNN, or using RNN. Following-on posterior threshold tuning or smoothing is applied for decision making. Other techniques for wakeword detection, such as those known in the art, may also be used.

Once the wakeword is detected, the local device 102 may "wake." The audio data 1002 may include data corresponding to the wakeword. Further, a local device may "wake" upon detection of speech/spoken audio above a threshold, as described herein. An ASR component 138 may convert the audio data 1002 into text. The ASR transcribes audio data into text data representing the words of the speech contained in the audio data 1002. The text data may then be used by other components for various purposes, such as executing system commands, inputting data, etc. A spoken utterance in the audio data is input to a processor configured to perform ASR which then interprets the utterance based on the similarity between the utterance and pre-established language models 1054 stored in an ASR model knowledge base (ASR Models Storage 1052). For example, the ASR process may compare the input audio data with models for sounds (e.g., subword units or phonemes) and sequences of sounds to identify words that match the sequence of sounds spoken in the utterance of the audio data.

The different ways a spoken utterance may be interpreted (i.e., the different hypotheses) may each be assigned a probability or a confidence score representing the likelihood that a particular set of words matches those spoken in the utterance. The confidence score may be based on a number of factors including, for example, the similarity of the sound in the utterance to models for language sounds (e.g., an acoustic model 1053 stored in an ASR Models Storage 1052), and the likelihood that a particular word that matches the sounds would be included in the sentence at the specific location (e.g., using a language or grammar model). Thus, each potential textual interpretation of the spoken utterance (hypothesis) is associated with a confidence score. Based on the considered factors and the assigned confidence score, the ASR process 138 outputs the most likely text recognized in the audio data. The ASR process may also output multiple hypotheses in the form of a lattice or an N-best list with each hypothesis corresponding to a confidence score or other score (such as probability scores, etc.).

The device or devices performing the ASR processing may include an acoustic front end (AFE) 1056 and a speech recognition engine 1058. The acoustic front end (AFE) 1056 transforms the audio data from the microphone into data for processing by the speech recognition engine 1058. The speech recognition engine 1058 compares the speech recognition data with acoustic models 1053, language models 1054, and other data models and information for recognizing the speech conveyed in the audio data. The AFE 1056 may reduce noise in the audio data and divide the digitized audio data into frames representing time intervals for which the AFE 1056 determines a number of values, called features, representing the qualities of the audio data, along with a set of those values, called a feature vector, representing the features/qualities of the audio data within the frame. Many different features may be determined, as known in the art, and each feature represents some quality of the audio that may be useful for ASR processing. A number of approaches may be used by the AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 1058 may process the output from the AFE 1056 with reference to information stored in speech/model storage (1052). Alternatively, post front-end processed data (such as feature vectors) may be received by the device executing ASR processing from another source besides the internal AFE. For example, the user device may process audio data into feature vectors (for example using an on-device AFE 1056).

The speech recognition engine 1058 attempts to match received feature vectors to language phonemes and words as known in the stored acoustic models 1053 and language models 1054. The speech recognition engine 1058 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR process will output speech results that make sense grammatically. The specific models used may be general models or may be models corresponding to a particular domain, such as music, banking, etc. By way of example, a user utterance may be "Alexa, start virtual working session?" The wake detection component may identify the wake word, otherwise described as a trigger expression, "Alexa," in the user utterance and may "wake" based on identifying the wake word. The speech recognition engine 1058 may identify, determine, and/or generate text data corresponding to the user utterance, here "start a virtual working session."

The speech recognition engine 1058 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound.

Following ASR processing, the ASR results may be sent by the speech recognition engine 1058 to other processing components, which may be local to the device performing ASR and/or distributed across the network(s). For example, ASR results in the form of a single textual representation of the speech, an N-best list including multiple hypotheses and respective scores, lattice, etc. may be utilized, for natural language understanding (NLU) processing, such as conversion of the text into commands for execution, by the user device and/or by another device (such as a server running a specific application like a search engine, etc.).

The device performing NLU processing 140 may include various components, including potentially dedicated processor(s), memory, storage, etc. As shown in FIG. 10, an NLU component 140 may include a recognizer 1063 that includes a named entity recognition (NER) component 1062 which is used to identify portions of query text that correspond to a named entity that may be recognizable by the system. A downstream process called named entity resolution links a text portion to a specific entity known to the system. To perform named entity resolution, the system may utilize gazetteer information (1084a-1084n) stored in entity library storage 1082. The gazetteer information may be used for entity resolution, for example matching ASR results with different entities (such as voice-enabled devices, accessory devices, etc.) Gazetteers may be linked to users (for example a particular gazetteer may be associated with a specific user's device associations), may be linked to certain domains (such as music, shopping, etc.), or may be organized in a variety of other ways.

Generally, the NLU process takes textual input (such as processed from ASR 138 based on the utterance input audio 1000) and attempts to make a semantic interpretation of the text. That is, the NLU process determines the meaning behind the text based on the individual words and then implements that meaning. NLU processing 140 interprets a text string to derive an intent or a desired action from the user as well as the pertinent pieces of information in the text that allow a device (e.g., device 102) to complete that action. For example, if a spoken utterance is processed using ASR 138 and outputs the text "start virtual work session" the NLU process may determine that the user intended to initiate a virtual working session.

The NLU 140 may process several textual inputs related to the same utterance. For example, if the ASR 138 outputs N text segments (as part of an N-best list), the NLU may process all N outputs to obtain NLU results.

As will be discussed further below, the NLU process may be configured to parse and tag to annotate text as part of NLU processing. For example, for the text "start virtual work session," "start work session" may be tagged as a command (to initiate a work session) and "virtual" may be tagged as the naming identifier of the work session.

To correctly perform NLU processing of speech input, an NLU process 140 may be configured to determine a "domain" of the utterance so as to determine and narrow down which services offered by the endpoint device may be relevant. For example, an endpoint device may offer services relating to interactions with a telephone service, a contact list service, a calendar/scheduling service, a music player service, etc. Words in a single text query may implicate more than one service, and some services may be functionally linked (e.g., both a telephone service and a calendar service may utilize data from the contact list).

The named entity recognition (NER) component 1062 receives a query in the form of ASR results and attempts to identify relevant grammars and lexical information that may be used to construe meaning. To do so, the NLU component 140 may begin by identifying potential domains that may relate to the received query. The NLU storage 1073 includes a database of devices (1074a-1074n) identifying domains associated with specific devices. For example, the user device may be associated with domains for music, telephony, calendaring, contact lists, and device-specific messages, but not video. In addition, the entity library may include database entries about specific services on a specific device, either indexed by Device ID, User ID, or Household ID, or some other indicator.

In NLU processing, a domain may represent a discrete set of activities having a common theme, such as "banking," "health care," "smart home," "communications," "shopping," "music," "calendaring," etc. As such, each domain may be associated with a particular recognizer 1063, language model and/or grammar database (1076a-1076n), a particular set of intents/actions (1078a-1078n), and a particular personalized lexicon (1086). Each gazetteer (1084a-1084n) may include domain-indexed lexical information associated with a particular user and/or device. For example, the Gazetteer A (1084a) includes domain-index lexical information 1086aa to 1086an. A user's contact-list lexical information might include the names of contacts. Since every user's contact list is presumably different, this personalized information improves entity resolution.

As noted above, in traditional NLU processing, a query may be processed applying the rules, models, and information applicable to each identified domain. For example, if a query potentially implicates both messages and, for example, music, the query may, substantially in parallel, be NLU processed using the grammar models and lexical information for messages, and will be processed using the grammar models and lexical information for music. The responses based on the query produced by each set of models is scored, with the overall highest ranked result from all applied domains ordinarily selected to be the correct result.

An intent classification (IC) component 1064 parses the query to determine an intent or intents for each identified domain, where the intent corresponds to the action to be performed that is responsive to the query. Each domain is associated with a database (1078a-1078n) of words linked to intents. For example, a communications intent database may link words and phrases such as "identify song," "song title," "determine song," to a "song title" intent. By way of further example, a timer intent database may link words and phrases such as "set," "start," "initiate," and "enable" to a "set timer" intent. A voice-message intent database, meanwhile, may link words and phrases such as "send a message," "send a voice message," "send the following," or the like. The IC component 1064 identifies potential intents for each identified domain by comparing words in the query to the words and phrases in the intents database 1078. In some instances, the determination of an intent by the IC component 1064 is performed using a set of rules or templates that are processed against the incoming text to identify a matching intent.

In order to generate a particular interpreted response, the NER 1062 applies the grammar models and lexical information associated with the respective domain to actually recognize a mention of one or more entities in the text of the query. In this manner, the NER 1062 identifies "slots" or values (i.e., particular words in query text) that may be needed for later command processing. Depending on the complexity of the NER 1062, it may also label each slot with a type of varying levels of specificity (such as noun, place, device name, device location, city, artist name, song name, amount of time, timer number, or the like). Each grammar model 1076 includes the names of entities (i.e., nouns) commonly found in speech about the particular domain (i.e., generic terms), whereas the lexical information 1086 from the gazetteer 1084 is personalized to the user(s) and/or the device. For instance, a grammar model associated with the shopping domain may include a database of words commonly used when people discuss shopping.

The intents identified by the IC component 1064 are linked to domain-specific grammar frameworks (included in 1076) with "slots" or "fields" to be filled with values. Each slot/field corresponds to a portion of the query text that the system believes corresponds to an entity. To make resolution more flexible, these frameworks would ordinarily not be structured as sentences, but rather based on associating slots with grammatical tags. For example, if "purchase" is an identified intent, a grammar (1076) framework or frameworks may correspond to sentence structures such as "purchase item called 'Item A' from Marketplace A."

For example, the NER component 1062 may parse the query to identify words as subject, object, verb, preposition, etc., based on grammar rules and/or models, prior to recognizing named entities. The identified verb may be used by the IC component 1064 to identify intent, which is then used by the NER component 1062 to identify frameworks. A framework for the intent of "play a song," meanwhile, may specify a list of slots/fields applicable to play the identified "song" and any object modifier (e.g., specifying a music collection from which the song should be accessed) or the like. The NER component 1062 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields (CRF), and the like.

The frameworks linked to the intent are then used to determine what database fields should be searched to determine the meaning of these phrases, such as searching a user's gazette for similarity with the framework slots. If the search of the gazetteer does not resolve the slot/field using gazetteer information, the NER component 1062 may search the database of generic words associated with the domain (in the knowledge base 1072). So, for instance, if the query was "identify this song," after failing to determine which song is currently being output, the NER component 1062 may search the domain vocabulary for songs that have been requested lately. In the alternative, generic words may be checked before the gazetteer information, or both may be tried, potentially producing two different results.

The output data from the NLU processing (which may include tagged text, commands, etc.) may then be sent to a speechlet 1050. The destination speechlet 1050 may be determined based on the NLU output. For example, if the NLU output includes a command to send a message, the destination speechlet 1050 may be a message sending application, such as one located on the user device or in a message sending appliance, configured to execute a message sending command. If the NLU output includes a search request, the destination application may include a search engine processor, such as one located on a search server, configured to execute a search command. After the appropriate command is generated based on the intent of the user, the speechlet 1050 may provide some or all of this information to a text-to-speech (TTS) engine. The TTS engine may then generate an actual audio file for outputting the audio data determined by the application (e.g., "okay," or "work session started").

The NLU operations of existing systems may take the form of a multi-domain architecture. Each domain (which may include a set of intents and entity slots that define a larger concept such as music, books etc. as well as components such as trained models, etc. used to perform various NLU operations such as NER, IC, or the like) may be constructed separately and made available to an NLU component 140 during runtime operations where NLU operations are performed on text (such as text output from an ASR component 138). Each domain may have specially configured components to perform various steps of the NLU operations.

For example, in a NLU system, the system may include a multi-domain architecture consisting of multiple domains for intents/commands executable by the system (or by other devices connected to the system), such as music, video, books, and information. The system may include a plurality of domain recognizers, where each domain may include its own recognizer 1063. Each recognizer may include various NLU components such as an NER component 1062, IC component 1064 and other components such as an entity resolver, or other components.

For example, a messaging domain recognizer 1063-A (Domain A) may have an NER component 1062-A that identifies what slots (i.e., portions of input text) may correspond to particular words relevant to that domain. The words may correspond to entities such as (for the messaging domain) a recipient. An NER component 1062 may use a machine learning model, such as a domain specific conditional random field (CRF) to both identify the portions corresponding to an entity as well as identify what type of entity corresponds to the text portion. The messaging domain recognizer 1063-A may also have its own intent classification (IC) component 1064-A that determines the intent of the text assuming that the text is within the proscribed domain. An IC component may use a model, such as a domain specific maximum entropy classifier to identify the intent of the text, where the intent is the action the user desires the system to perform. For this purpose, device 102 may include a model training component. The model training component may be used to train the classifier(s)/machine learning models discussed above.

As noted above, multiple devices may be employed in a single speech-processing system. In such a multi-device system, each of the devices may include different components for performing different aspects of the speech processing. The multiple devices may include overlapping components. The components of the user device and the remote system 104, as illustrated herein are exemplary, and may be located in a stand-alone device or may be included, in whole or in part, as a component of a larger device or system, may be distributed across a network or multiple devices connected by a network, etc.

Figure 11:
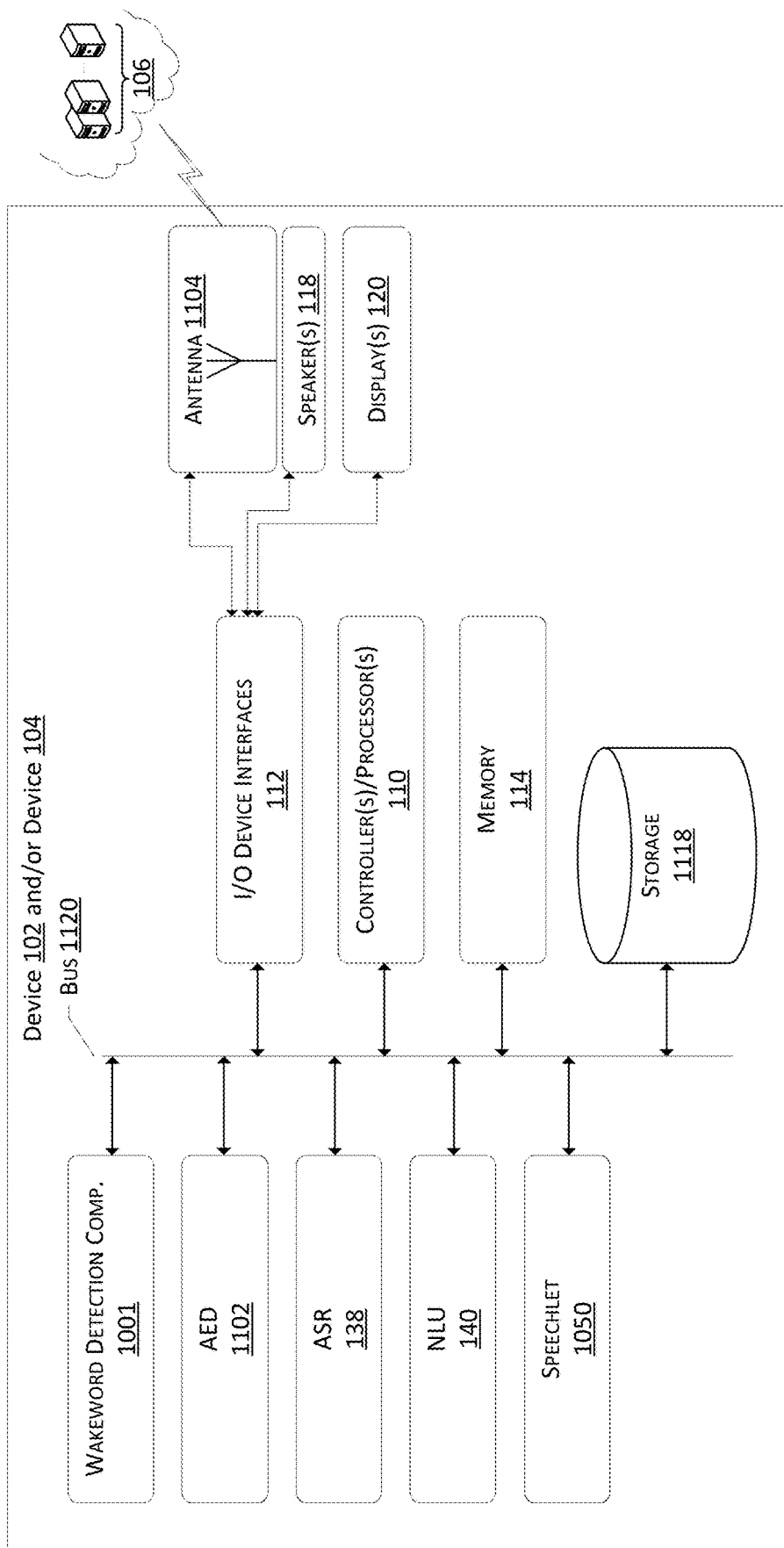
FIG. 11 illustrates a conceptual diagram of example components of an electronic device that may be utilized in association with contextual awareness in dynamic device groups.

FIG. 11 illustrates a conceptual diagram of example components of an electronic device 102, 104 that may be utilized in association with contextual awareness in dynamic device groups. The device 102, 104 may be implemented as a standalone device 102, 104 that is relatively simple in terms of functional capabilities with limited input/output components, memory, and processing capabilities. For instance, the device 102, 104 may not have a keyboard, keypad, or other form of mechanical input. The device 102, 104 may also lack a display (other than simple lights, for instance) and a touch screen to facilitate visual presentation and user touch input. Instead, the device 102, 104 may be implemented with the ability to receive and output audio, a network interface (wireless or wire-based), power, and processing/memory capabilities. In certain implementations, a limited set of one or more input components may be employed (e.g., a dedicated button to initiate a configuration, power on/off, etc.) by the device 102, 104. Nonetheless, the primary, and potentially only mode, of user interaction with the device 102, 104 is through voice input and audible output. In some instances, the device 102, 104 may simply comprise a microphone 116, a power source, and functionality for sending generated audio data via one or more antennas 1104 to another device.

The device 102, 104 may also be implemented as a more sophisticated computing device, such as a computing device similar to, or the same as, a smart phone or personal digital assistant. The device 102, 104 may include a display 120 with a touch interface and various buttons for providing input as well as additional functionality such as the ability to send and receive communications. Alternative implementations of the device 102, 104 may also include configurations as a personal computer. The personal computer may include a keyboard, a mouse, a display 120, and other hardware or functionality that is found on a desktop, notebook, netbook, or other personal computing devices. In examples, the device 102, 104 may include an automobile, such as a car. In other examples, the device 102, 104 may include a pin on a user's clothes or a phone on a user's person. In examples, the device 102 and may not include speaker(s) 118 and may utilize speaker(s) 118 of an external or peripheral device to output audio via the speaker(s) 118 of the external/peripheral device. In this example, the device 102, 104 might represent a set-top box (STB), and the device 102, 104 may utilize speaker(s) 118 of another device such as a television that is connected to the STB for output of audio via the external speakers. In other examples, the device 102, 104 may not include the microphone(s) 116, and instead, the device 102, 104 can utilize microphone(s) of an external or peripheral device to capture audio and/or generate audio data. In this example, the device 102, 104 may utilize microphone(s) of a headset that is coupled (wired or wirelessly) to the device 102, 104. These types of devices are provided by way of example and are not intended to be limiting, as the techniques described in this disclosure may be used in essentially any device that has an ability to recognize speech input or other types of natural language input.

The device 102, 104 of FIG. 11 may include one or more controllers/processors 110, that may include a central processing unit (CPU) for processing data and computer-readable instructions, and memory 114 for storing data and instructions of the device 102, 104. The device 102, 104 may also be connected to removable or external non-volatile memory and/or storage, such as a removable memory card, memory key drive, networked storage, etc., through input/output device interfaces 112.

Computer instructions for operating the device 102, 104 and its various components may be executed by the device's controller(s)/processor(s) 110, using the memory 114 as temporary "working" storage at runtime. A device's computer instructions may be stored in a non-transitory manner in non-volatile memory 114, storage 1118, or an external device(s). Alternatively, some or all of the executable instructions may be embedded in hardware or firmware on the device 102, 104 in addition to or instead of software.

The device 102, 104 may include input/output device interfaces 112. A variety of components may be connected through the input/output device interfaces 112. Additionally, the device 102 may include an address/data bus 1120 for conveying data among components of the respective device. Each component within a device 102, 104 may also be directly connected to other components in addition to, or instead of, being connected to other components across the bus 1120.

The device 102, 104 may include a display 120, which may comprise a touch interface. Any suitable display technology, such as liquid crystal display (LCD), organic light emitting diode (OLED), electrophoretic, and so on, may be utilized for the displays 120. Furthermore, the processor(s) 110 may comprise graphics processors for driving animation and video output on the associated display, or the device 102, 104 may be "headless" and may primarily rely on spoken commands for input. As a way of indicating to a user that a connection between another device has been opened, the device 102, 104 may be configured with one or more visual indicators, such as the light elements(s), which may be in the form of LED(s) or similar components (not illustrated), that may change color, flash, or otherwise provide visible light output, such as for a notification indicator on the device 102, 104. The input/output device interfaces 112 that connect to a variety of components. This wired or a wireless audio and/or video port may allow for input/output of audio/video to/from the device 102, 104. The device 102, 104 may also include an audio capture component. The audio capture component may be, for example, a microphone 116 or array of microphones, a wired headset or a wireless headset, etc. The microphone 116 may be configured to capture audio. If an array of microphones is included, approximate distance to a sound's point of origin may be determined using acoustic localization based on time and amplitude differences between sounds captured by different microphones of the array. The device 102, 104 (using microphone 116, wakeword detection component 1101, ASR component 138, etc.) may be configured to generate audio data corresponding to captured audio. The device 102, 104 (using input/output device interfaces 112, antenna 1104, etc.) may also be configured to transmit the audio data to the remote system 106 for further processing or to process the data using internal components such as a wakeword detection component 801.

Via the antenna(s) 1104, the input/output device interface 112 may connect to one or more networks 108 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Universal Serial Bus (USB) connections may also be supported. Power may be provided to the device 102, 104 via wired connection to an external alternating current (AC) outlet, and/or via onboard power sources, such as batteries, solar panels, etc.

Through the network(s) 108, the speech-processing system may be distributed across a networked environment. Accordingly, the device 102, 104 and/or the remote system 106 may include an ASR component 138. The ASR component 138 of device 102, 104 may be of limited or extended capabilities. The ASR component 852 may include language models stored in ASR model storage component, and an ASR component 138 that performs automatic speech recognition. If limited speech recognition is included, the ASR component 138 may be configured to identify a limited number of words, such as keywords detected by the device, whereas extended speech recognition may be configured to recognize a much larger range of words.

The device 102, 104 and/or the remote system 106 may include a limited or extended NLU component 140. The NLU component 140 of device 102, 104 may be of limited or extended capabilities. The NLU component 140 may comprise a name entity recognition module, an intent classification module and/or other components. The NLU component 140 may also include a stored knowledge base and/or entity library, or those storages may be separately located.

In examples, AED 1102 may also be performed by the device 102, 104. In these examples, the operations may include causing the AED component 1102 to be enabled or otherwise turned on, or the operations may include causing the AED component 1102 to transition from a first mode to a second mode representing a higher sensitivity to audio data generated by the microphone 116. The AED component 1102 may utilize the audio data generated by the microphone 116 to determine if an audio fingerprint of the audio data, or portion thereof, corresponds to a reference audio fingerprint associated with the predefined event. For example, the one or more predefined events may be associated with one or more reference audio fingerprint characteristics of sound made when the event occurs. For example, the sound of a given person speaking may have a given audio fingerprint, the sound of a different person speaking may have another audio fingerprint, etc. The AED component 1102 may receive an indication that audio has been captured and may utilize reference audio fingerprints for analysis in association with the audio fingerprint in question. It should be understood that while the term "audio fingerprint" is utilized herein, that term may include other terms such as "audio fingerprint" and/or "audio characteristics" and may correspond to characteristics of the audio data. For example, audio fingerprints may be generated utilizing a spectrogram that may split the audio data up over time and graphs frequency to amplitude over time. Peaks in frequency and/or amplitude may be identified in the spectrogram and may be utilized as characteristic points for comparison to reference audio fingerprints. The AED component 802 may determine that the audio fingerprint corresponds to at least one of the reference audio fingerprints, such as to a given confidence level, and may generate confirmatory data indicating that the audio fingerprint corresponds to the at least one reference audio fingerprint.

The device 102, 104 and/or the remote system 106 may also include speechlet 1050 that is configured to execute commands/functions associated with a spoken command as described herein. The device 102, 104 may include a wake word engine, which may be a separate component or may be included in an ASR component 138. The wakeword detection component 1001 receives audio signals and detects occurrences of a particular expression (such as a configured keyword) in the audio. This may include detecting a change in frequencies over a specific period of time where the change in frequencies results in a specific audio fingerprint that the system recognizes as corresponding to the keyword. Keyword detection may include analyzing individual directional audio signals, such as those processed post-beamforming if applicable. Other techniques known in the art of keyword detection (also known as keyword spotting) may also be used. In some embodiments, the device 102, 104 may be configured collectively to identify a set of the directional audio signals in which the wake expression is detected or in which the wake expression is likely to have occurred. In examples, the device 102, 104 and may not include speaker(s) 118 and may utilize speaker(s) of an external or peripheral device to output audio via the speaker(s) of the external/peripheral device.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative of some embodiments that fall within the scope of the claims.

What is claimed is:

1. A system, comprising:
   one or more processors; and
   non-transitory computer-readable media storing computer-executable instructions that, when executed by the one or more processors, cause the one or more processors to perform operations comprising:
      receiving, from a first device and while the first device is outputting audio representing first content, first input data indicating a request to alter output of the audio;
      determining, from a first identifier of the first device, that the first device is associated with a device group including a second device that is outputting the audio in time-synchronization with the first device, wherein the second device was associated with the device group during output of the first content;
      determining, from the first device being associated with the device group, first context data associated with the first device at a time when the first input data was received, the first context data indicating the first device and the second device of the device group are associated with a device state of the first device at the time;
      generating a first command responsive to the first input data; and
      sending the first command to at least one device in the device group, the first command causing the first device and the second device to alter output of the audio.

2. The system of claim 1, the operations further comprising:
   receiving, from the first device and while the first device is outputting the audio representing the first content, second input data requesting output of second content instead of the first content, the second content being unassociated with the first content;

determining that the first device is associated with the device group when the second input data is received;

determining, from the first device being associated with the device group, second context data of the first device when the second input data was received, the second context data indicating the first device and the second device of the device group are associated with the device state of the first device at the time when the second input data was received; and sending, utilizing the second context data, a second command configured to cause the first device and the second device of the device group to output the second content instead of the first content.

3. The system of claim 1, the operations further comprising:

querying an application for the first command while the first context data and the device state is being determined;

determining a first portion of the first command while the first context data and the device state is being determined, the first portion of the first command indicating an action to be performed in association with the first content;

storing the first context data in association with a session identifier; and determining a second portion of the first command from the first context data as identified utilizing the session identifier, the second portion of the first command indicating the first device and the second device are to perform the action.

4. The system of claim 1, the operations further comprising:

determining, from presence data, that a user has moved from a first environment associated with the first device to a second environment associated with a third device;

causing the third device to be associated with the device group in response to the user moving to the second environment;

receiving, from the third device, second input data requesting alteration of output of the audio; and sending, from the third device being associated with the device group, a second command configured to cause the first device, the second device, and the third device to alter output of the audio.

5. A method, comprising:

receiving, from a first device and while the first device is outputting first content including audio, first input data requesting an action to be performed in association with the first content;

determining, from first context data indicating that the first device and a second device are outputting the first content in time-synchronization when the first input data is received, that the first device is associated with a device group including the second device, wherein the second device was associated with the device group during output of the first content;

determining second context data indicating that the first device and the second device of the device group are associated with a device state of the first device at a time when the first input data was received;

generating a first command responsive to the first input data; and sending, based at least in part on the second context data, the first command to at least one device in the device group, the first command causing the first device and the second device to perform the action.

6. The method of claim 5, further comprising:

causing output of a recommendation on the first device, the recommendation associated with second content that is unassociated with the first content;

receiving, from the first device and while the first device is outputting the first content, second input data associated with the recommendation;

determining third context data of the first device when the second input data was received, the third context data indicating the first device and the second device are outputting the first content when the second input data was received; and sending, based at least in part on the third context data, a second command configured to cause the first device and the second device to output the second content instead of the first content.

7. The method of claim 5, further comprising:

determining a first portion of the first command while the first context data is being determined, the first portion of the first command indicating the action to be performed;

storing the first context data in association with a session identifier; and determining a second portion of the first command from the first context data as identified utilizing the session identifier, the second portion of the first command indicating the first device and the second device are to perform the action.

8. The method of claim 5, further comprising:

determining, from data indicating presence detection, that a user has moved from a first environment associated with the first device to a second environment associated with a third device;

causing the third device to be associated with the device group based at least in part on determining that the user has moved to the second environment;

receiving, from the third device, second input data requesting alteration of output of the first content; and sending, based at least in part on the third device being associated with the device group, a second command configured to cause the first device, the second device, and the third device to alter output of the first content.

9. The method of claim 5, further comprising:

generating a context identifier associated with the first context data;

associating the context identifier with the first input data such that the first context data is approved for use in association with the first input data;

receiving second input data requesting alteration of output of the first content; and determining to refrain from utilizing the first context data in association with the second input data based at least in part on the context identifier being associated with the first input data instead of the second input data.

10. The method of claim 5, further comprising:

receiving, from the first device, a task identifier associated with the action to be performed;

sending, while the first context data is being determined, the task identifier to an application configured to determine the first command; and wherein generating the first command comprises generating the first command based at least in part on the task identifier and the first context data.

11. The method of claim 5, wherein:
the first content is initially output by the second device;
the device group is generated while the first content is output and based at least in part on receiving first user input requesting that the first device also output the first content; and
input representing the first input data was received at a graphical user interface of the first device while the first device and the second device output the first content.

12. The method of claim 5, further comprising:
determining, from data indicating presence detection, that a user has moved from a first environment associated with the first device to a second environment associated with a third device;
causing the third device to be associated with the device group based at least in part on determining that the user has moved to the second environment;
determining that presence of the user is detected in the second environment for at least a threshold amount of time;
causing the first device to be dissociated from the device group based at least in part on the presence of the user being detected in the second environment for the at least the threshold amount of time;
receiving, from the third device, second input data requesting alteration of output of the first content; and
sending, based at least in part on the third device being associated with the device group, a second command configured to cause the second device and the third device to alter output of the first content.

13. A system, comprising:
one or more processors; and
non-transitory computer-readable media storing computer-executable instructions that, when executed by the one or more processors, cause the one or more processors to perform operations comprising:
receiving, from a first device and while the first device is outputting first content including audio, first input data requesting an action to be performed in association with the first content;
determining, from first context data indicating that the first device and a second device are outputting the first content in time-synchronization when the first input data is received, that the first device is associated with a device group including the second device, wherein the second device was associated with the device group during output of the first content;
determining second context data indicating that the first device and the second device of the device group are associated with a device state of the first device at a time when the first input data was received;
generating a first command responsive to the first input data; and
sending, based at least in part on the second context data, the first command to at least one device in the device group, the first command causing the first device and the second device to perform the action.

14. The system of claim 13, the operations further comprising:
causing output of a recommendation on the first device, the recommendation associated with second content that is unassociated with the first content;
receiving, from the first device and while the first device is outputting the first content, second input data associated with the recommendation;
determining third context data of the first device when the second input data was received, the third context data indicating the first device and the second device are outputting the first content when the second input data was received; and
sending, based at least in part on the third context data, a second command configured to cause the first device and the second device to output the second content instead of the first content.

15. The system of claim 13, the operations further comprising:
determining a first portion of the first command while the first context data is being determined, the first portion of the first command indicating the action to be performed;
storing the first context data in association with a session identifier; and
determining a second portion of the first command from the first context data as identified utilizing the session identifier, the second portion of the first command indicating the first device and the second device are to perform the action.

16. The system of claim 13, the operations further comprising:
determining, from data indicating presence detection, that a user has moved from a first environment associated with the first device to a second environment associated with a third device;
causing the third device to be associated with the device group based at least in part on determining that the user has moved to the second environment;
receiving, from the third device, second input data requesting alteration of output of the first content; and
sending, based at least in part on the third device being associated with the device group, a second command configured to cause the first device, the second device, and the third device to alter output of the first content.

17. The system of claim 13, the operations further comprising:
generating a context identifier associated with the first context data;
associating the context identifier with the first input data such that the first context data is approved for use in association with the first input data;
receiving second input data requesting alteration of output of the first content; and
determining to refrain from utilizing the first context data in association with the second input data based at least in part on the context identifier being associated with the first input data instead of the second input data.

18. The system of claim 13, the operations further comprising:
receiving, from the first device, a task identifier associated with the action to be performed;
sending, while the first context data is being determined, the task identifier to an application configured to determine the first command; and
wherein generating the first command comprises generating the first command based at least in part on the task identifier and the first context data.

19. The system of claim 13, wherein:
the first content is initially output by the second device;
the device group is generated while the first content is output and based at least in part on receiving first user input requesting the first device also output the first content; and input representing the first input data was received at a graphical user interface of the first device while the first device and the second device output the first content.

20. The system of claim 13, the operations further comprising:
- determining, from data indicating presence detection, that a user has moved from a first environment associated with the first device to a second environment associated with a third device;
- causing the third device to be associated with the device group based at least in part on determining that the user has moved to the second environment;
- determining that presence of the user is detected in the second environment for at least a threshold amount of time;
- causing the first device to be dissociated from the device group based at least in part on the presence of the user being detected in the second environment for the at least the threshold amount of time;
- receiving, from the third device, second input data requesting alteration of output of the first content; and
- sending, based at least in part on the third device being associated with the device group, a second command configured to cause the second device and the third device to alter output of the first content.

* * * * *